(12) United States Patent
Wijesena et al.

(10) Patent No.: US 10,259,191 B2
(45) Date of Patent: Apr. 16, 2019

(54) MOISTURE MANAGEMENT FABRIC

(71) Applicant: Sri Lanka Institute of Nanotechnology (PVT) Ltd., Mahenwatta, Pitipana, Homagama (LK)

(72) Inventors: Ruchira Nalinga Wijesena, Homagama (LK); Palihenage Nadeeka Dushani Tissera, Homagama (LK); Rangana Perera, Homagama (LK); K. M. Nalin de Silva, Homagama (LK)

(73) Assignee: Sri Lanka Institute of Nanotechnology (PVT) Ltd., Pitipana (LK)

( * ) Notice: Subject to any disclaimer, the term of this patent is extended or adjusted under 35 U.S.C. 154(b) by 283 days.

(21) Appl. No.: 14/024,906

(22) Filed: Sep. 12, 2013

(65) Prior Publication Data
US 2015/0072582 A1 Mar. 12, 2015

(51) Int. Cl.
*B32B 5/26* (2006.01)
*D06M 11/46* (2006.01)
(Continued)

(52) U.S. Cl.
CPC .............. *B32B 5/26* (2013.01); *A41D 31/00* (2013.01); *B32B 5/145* (2013.01); *D06M 11/38* (2013.01); *D06M 11/46* (2013.01); *D06M 13/188* (2013.01); *D06M 15/03* (2013.01); *D06M 23/08* (2013.01); *D06M 23/16* (2013.01); *A41D 2400/62* (2013.01); *B32B 7/02* (2013.01); *B32B 2250/20* (2013.01); *B32B 2262/02* (2013.01); *B32B 2262/062* (2013.01); *B32B 2262/08* (2013.01); *B32B 2307/728* (2013.01);
(Continued)

(58) Field of Classification Search
CPC ...... D06M 15/03–15/13; D06M 13/08; D06M 11/46; D06M 2200/12; D06M 2101/06; B32B 7/02
USPC ........ 442/59, 64, 71, 72, 76, 74, 75, 79, 85, 442/86, 118, 123, 152, 153; 428/212
See application file for complete search history.

(56) References Cited

U.S. PATENT DOCUMENTS 7,842,625 B1 * 11/2010 Stockton ............... D06M 13/02
442/164
2005/0239361 A1 10/2005 Fay, Sr. et al.
(Continued)

OTHER PUBLICATIONS

Nawalakhe, R., Shi, Q., Vitchuli, N., Noar, J., Caldwell, J. M., Breidt, F., Bourham, M. A., Zhang, X. and McCord, M. G. (Feb. 2013), Novel atmospheric plasma enhanced chitosan nanofiber/gauze composite wound dressings. J. Appl. Polym. Sci., 129: 916-923. doi: 10.1002/app.388.*
Parthasarathi, V. "Synthesis and characterization of titanium dioxide nano-particles and their applications to textiles for microbe resistance." Journal of Textile and Apparel, Technology and Management 6.2 (2009).*
International Search Report and Written Opinion.
(Continued)

*Primary Examiner* — Lynda Salvatore
(74) *Attorney, Agent, or Firm* — Alston & Bird LLP

(57) ABSTRACT

This invention relates to a moisture management fabric and methods of producing such a fabric. In some embodiments, the moisture management fabric is a multi-layered fabric comprising an inner layer, and intermediate layer and an outer layer. In other embodiments the fabric is one or two layers. In some embodiments, the inner layer comprises a fabric treated with a nanoparticle dispersion. In some embodiments, the intermediate, inner, or single layer comprises a hydrophilicity gradient. In some other embodiments, the outer layer comprises at least one nanofiber.

11 Claims, 13 Drawing Sheets

(51) Int. Cl.
  *D06M 15/03* (2006.01)
  *A41D 31/00* (2019.01)
  *D06M 11/38* (2006.01)
  *D06M 13/188* (2006.01)
  *D06M 23/08* (2006.01)
  *D06M 23/16* (2006.01)
  *B32B 5/14* (2006.01)
  *B32B 7/02* (2019.01)
  *D06M 101/06* (2006.01)

(52) U.S. Cl.
  CPC .... *D06M 2101/06* (2013.01); *D06M 2200/00* (2013.01); *D06M 2200/12* (2013.01); *Y10T 428/24942* (2015.01); *Y10T 442/2484* (2015.04)

(56) References Cited

U.S. PATENT DOCUMENTS

| | | | |
|---|---|---|---|
| 2006/0148356 A1 | 7/2006 | Zhang et al. | |
| 2008/0082067 A1* | 4/2008 | Weerawarna | A61L 15/60 604/368 |
| 2008/0128044 A1 | 6/2008 | Barak et al. | |
| 2009/0076430 A1* | 3/2009 | Simpson | A61F 13/022 602/42 |
| 2009/0104427 A1 | 4/2009 | Wan et al. | |
| 2010/0055437 A1* | 3/2010 | Fink | A61L 15/46 428/221 |
| 2010/0113537 A1* | 5/2010 | Nonaka | A01N 25/34 514/358 |

\* cited by examiner

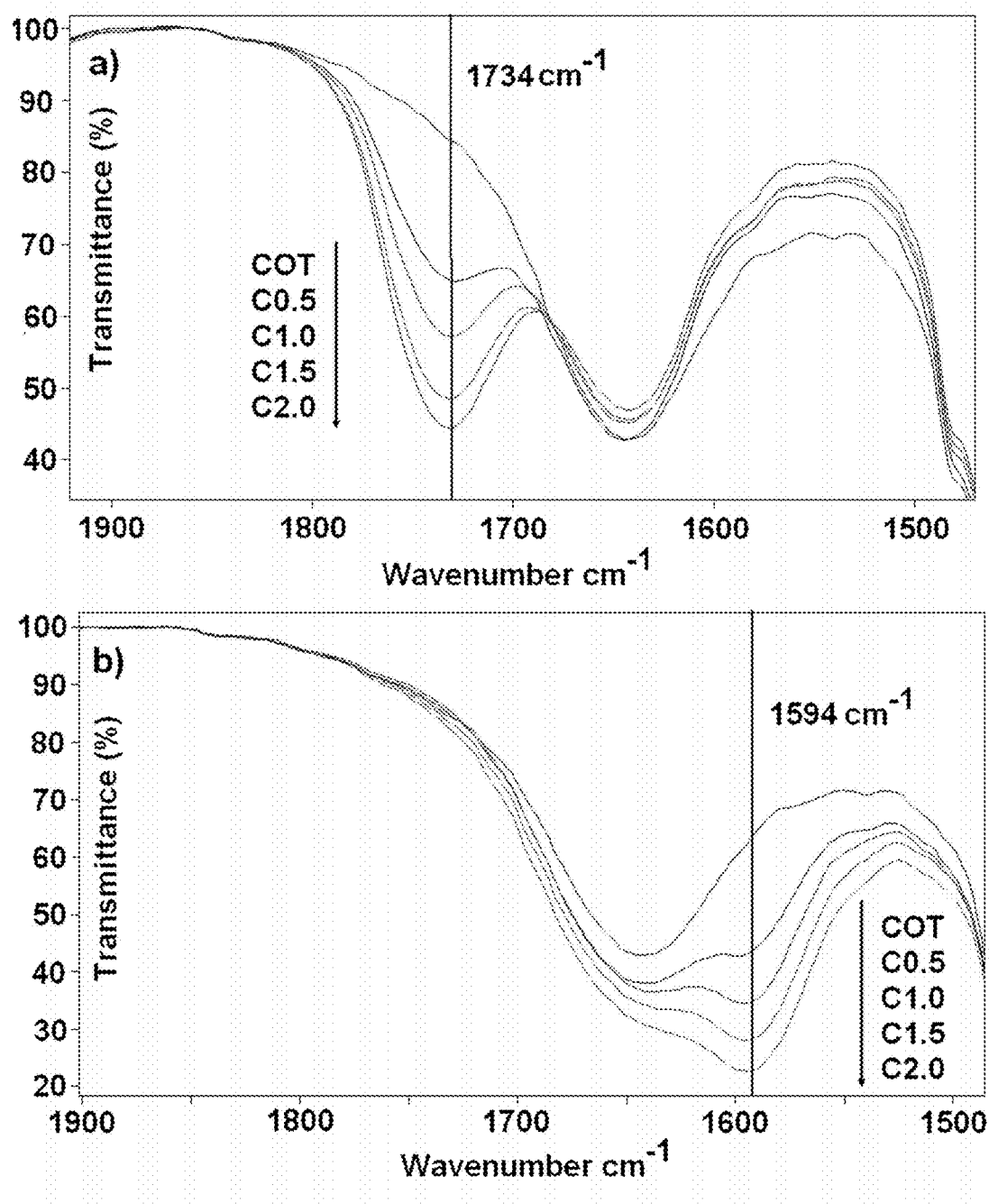
FIG 4 (a) and 4 (b)

FIG 5 (a) and (b)

FIG 7 (a), (b), (c), and (d)

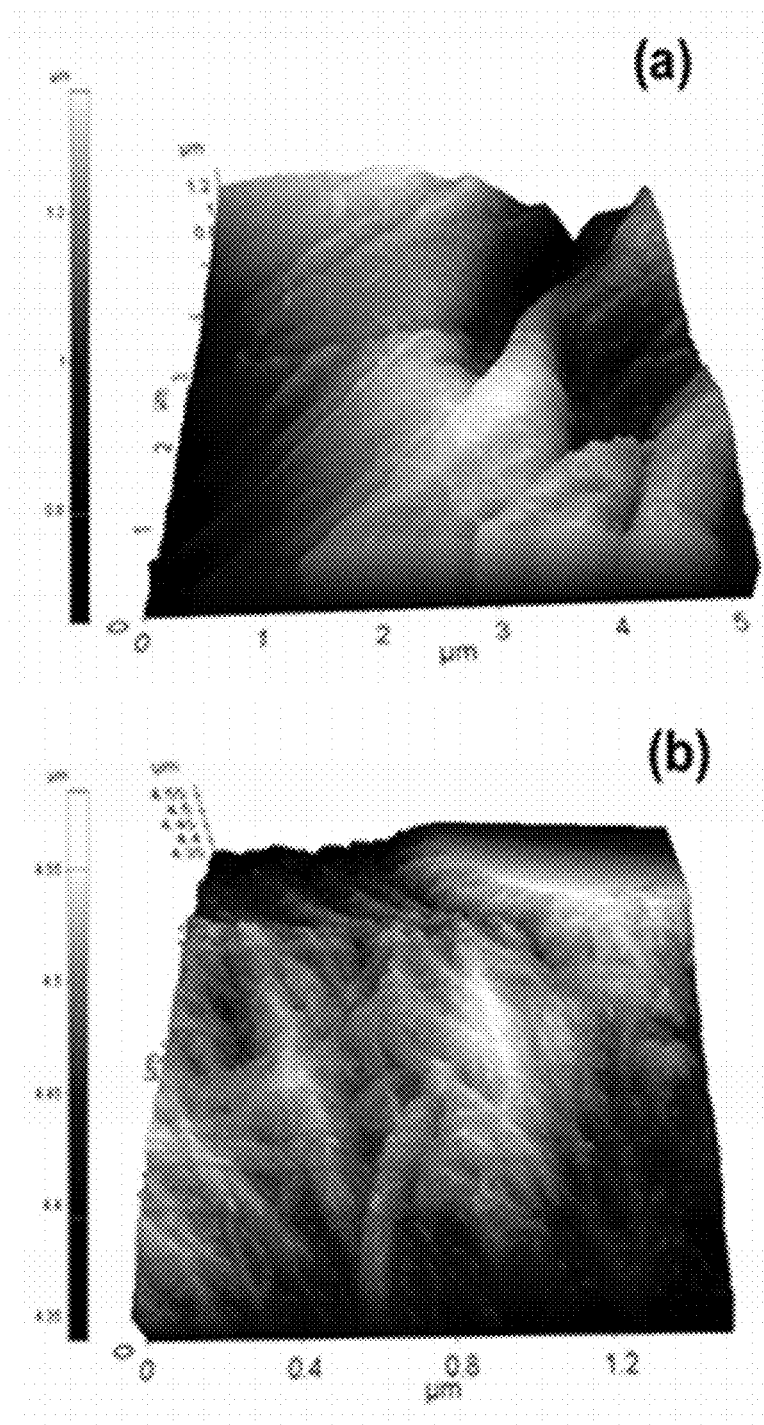
FIG 9 (a) and 9 (b)

MOISTURE MANAGEMENT FABRIC

FIELD

This invention relates to a moisture management fabric that can efficiently transfer moisture from a skin-fabric interface to an atmosphere-fabric interface using hydrophilic fibers.

BACKGROUND

Moisture management is defined as "The controlled movement of water vapor and liquid water (perspiration) from the surface of the skin to the atmosphere through the fabric" (See Cotton Incorporated, Cary N.C., 2002, 100% Cotton Moisture Management, Journal of Textile And Apparel, Technology and Management, Vol. 2., Issue 3). Moisture management is a key property that determines the comfort parameters of a fabric since poor moisture management can lead to problems such as a wet feeling fabric, a high humid microclimate between the skin and the fabric, clinging of the fabric, etc. Efficient moisture management may depend on efficient moisture absorption, transport and evaporation properties of a fabric (See Wang, L., Li, C., 2005, A new method for measuring dynamic fabric heat and moisture comfort, Experimental Thermal and Fluid Science 29, pp. 705-714; Li. Chuang, 2001, Research on Dynamic Thermohydro-Comfort Property of Textiles, Shanghai Textile Science & Technology 29 (2) pp. 53-55; L. Fourt, N. R. S. Holloes, 1984, The Comfort and Function of Clothing, Textile Industry Press, Beijing; AATCC review, March 2004 Moisture Management: Myths Magic and misconception. William A. Reack. p. 42).

Consumers prefer functional textiles or fabrics, which are, at the same time, comfortable. While functional fabrics have many desirable properties, moisture management or water transport has become the primary standard for functional fabrics. Moisture management fabrics have attracted great interest in the textile industry since this property has become more popular in garments and apparel produced for active-wear applications. Currently, efficient moisture management systems are mainly fabricated with synthetic fiber types such as nylon and polyester. These moisture management systems are added to the fabric in the manufacturing stage.

Fabrics with moisture management properties can transport moisture from the wearer's skin surface into the surface of the fabric, and then release the moisture to the atmosphere. Accordingly, such functional fabrics transport sweat and moisture from the surface of the skin to the outer surface of the fabric. This keeps the wearer's body dry and comfortable and helps the fabric from clinging to the wearer's body. Some fabrics with good moisture management properties are made from polyamide (PA) or polyester (PE). These fabrics are lightweight, absorb moisture quickly, and remove the moisture from the fabric rapidly.

However, natural fiber types such as cotton are highly preferable among wearers since these fiber types often exhibit perfect optical, thermal, mechanical and electrical properties as suited for clothing applications unlike certain synthetic fiber types. Despite these advantages these fibers are known to accumulate relatively large amounts of moisture as compared to synthetic fibers due to their hydrophilic nature (See Cotton Incorporated, Cary N.C., 2002, 100% Cotton Moisture Management, Journal of Textile And Apparel, Technology and Management, Vol. 2., Issue 3). In addition, many natural fiber types also show very slow wicking and drying rates, leading to poor moisture management properties. Id.

The human body releases moisture in the form of perspiration and sweat. Some fabrics act as a buffer between the skin and the environment and a fabric's properties will determine the conditions of the microclimate between skin and the fabric. During sweating, this microclimate can be saturated with water vapor and can have a higher relative humidity than the external environment. Since relative humidity of the microclimate is what is felt by the wearer, it is important to regulate this microclimate at a level comfortable to the wearer. To remain comfortable, a good fabric must have improved performance, especially in wicking property, moisture vapor transmission (Breathability), transer of water and faster drying. Effective moisture management of a fabric will depend mainly on its ability to transport moisture away from the inner side of the fabric to the outer surface where more spreading and evaporation occurs. To achieve these goals, the fabric should demonstrate enhanced wicking power while having more absorbent capacity of water in the outer surface of the fabric than the inner side. It should also have the ability to transport moisture vapor more effectively through the fabric, so that humidity equilibrium between skin and environment is kept at a point which is not uncomfortable to wearer.

Reducing a fabric's effective moisture absorbent capacity is the most widely used method to improve moisture management properties. This is achieved by blending certain amount of hydrophobic fibers to the fabric during the fabrication stage. This improves the wicking of the fabric and reduces the amount of water needed to saturate the fabric thus providing fast moisture transport across the fabric and reduced drying time. A slightly different approach uses localized regions of less moisture absorbency through chemical treatments. This technology is known as wicking windows technology (See Cotton Inc. Wicking Windows™.

Moisture management fabrics are also fabricated using denier differential techniques which produce two layers of fibers having different fiber sizes. Since the wicking is a capillary effect essentially facilitated by smaller fiber sizes, the technique produces a fabric having two distinct wicking regions. Inner surface is typically made with fibers having small fibers and the outer surface is made with larger fiber sizes which facilitate the wicking from inner surface to outer surface (See WO 2012/096920).

Fabrics with moisture management properties can be constructed with fibers having special fiber morphologies. These fiber cross sections are especially designed to have capillaries on their surface thus improving the rate of wicking.

To the best of our knowledge, improvement of the moisture management properties of cotton using any form of super absorbent nanofibers has not been reported. Pommet and Gardner showed that the surface modified cellulosic fibers with cellulose nanofibers have improved mechanical properties. (See M. Pommet, J. Juntaro, J. Y. Y. Heng et al., "Surface modification of natural fibers using bacteria: depositing bacterial cellulose onto natural fibers to create hierarchical fiber reinforced anocomposites," Biomacromolecules, vol. 9, no. 6, pp. 1643-1651, 2008; D. J. Gardner, G. S. Opor to, R. Mills, and M. Samir, "Adhesion and surface issues in cellulose and nanocellulose," Journal of Adhesion Science and Technology, vol. 22, pp. 545-545, 2008).

However, the effect of cellulose nanofibers on the moisture management properties of a fabric made from these fibers was not investigated. Ting has evaluated the effect of cellulose nano powders on the cotton fabrics has and reported that the fabric shows better moisture management properties compared to normal cotton (See YingTing Guan and Yi Li, 'Fabrication of cotton nano-powder and its textile application' Chinese Science Bulletin, Volume 53, Number 23, 3735-3740).

These reported methods can be mainly classified in to two different groups. First, moisture management effect is obtained with the aid of especially designed fabric structures. Typically, these structures use more a hydrophobic yarn arrangement near the skin and more hydrophilic yarn arrangement towards the outer side. Due to hydrophobic nature of the inner surface, fabric tends to be relatively dry under sweating conditions. The hydrophilic yarn arrangement in the outer surface can absorb the moisture wicked away from hydrophobic region. (See U.S. Pat. Nos. 5,217, 782, 6,427,493, 6,432,504, 7,217,456, U.S. 2003/0182922, U.S. 2005/0188470, U.S. 2005/0239361, U.S. 2006/0148356, U.S. 2007/0034278, U.S. 2008/0128044, U.S. 2008/0289090, and U.S. 2009/0104427).

Others suggest the use of especially designed yarn types to be used as potential materials. Capillary structures were built in to the yarn morphology and these structures are known to assist in wicking of the fabric. U.S. Pat. No. 6,509,285 and U.S. 2006/0148349 suggest similar techniques to enhance moisture management.

In view of the above, it is desirable to provide a moisture management fabric that will exhibit sought-after comfort and mechanical attributes, while at the same time being able to efficiently transfer moisture away from the wearer.

SUMMARY

The embodiments provided herein present a moisture management fabric. In some embodiments, the fabric is comprised of three layers or regions. In these embodiments, the layered fabric comprises an inner layer comprising fabric treated with a nanoparticle dispersion. In these embodiments, the layered fabric also comprises an outer layer. In these embodiments, the outer layer is more moisture absorbent than the inner layer. In some of these embodiments, the outer layer of the fabric comprises nanofibers. In some of these embodiments, the nanofibers are grafted onto the surface of the outer layer. In some of these embodiments, the grafted nanofibers are chitosan or chitin nanofibers. In some of these embodiments, the outer layer of the moisture management fabric comprises a nanofiber concentration of at least about 0.25 g/l. The nanofibers may have hydrophilic and moisture absorbing properties. In these embodiments, an intermediate layer is positioned in between the inner layer and the outer layer. The intermediate layer comprises a moisture transfer gradient increasing in hydrophilicity in the direction of the inner layer to the outer layer.

Other embodiments comprise two layers or regions. In a first embodiment of a two-layered fabric, the moisture management fabric comprises an inner layer and an outer layer. In this first two-layered embodiment, this inner layer can comprise a fabric treated with a nanoparticle dispersion. In this first two-layered embodiment, the outer layer is more moisture absorbent than the inner layer. In this first two-layered embodiment, the outer layer comprises a moisture transfer gradient increasing in hydrophilicity in the direction away from the inner layer.

In a second two-layered embodiment, the moisture management fabric comprises an inner layer and an outer layer. In this second two-layered embodiment, the fabric comprises an inner layer comprising hydrophilic fibers. In this second two-layered embodiment, this inner layer comprises a moisture transfer gradient increasing in hydrophilicity in the direction toward the outer layer. In this second two-layered embodiment, the outer layer of the fabric comprises nanofibers. In some two-layered embodiments, the nanofibers are grafted onto the surface of the outer layer. In some two-layered embodiments, the grafted nanofibers are chitosan or chitin nanofibers. In some two-layered embodiments, the outer layer of the moisture management fabric comprises a nanofiber concentration of at least about 0.25 g/l.

In other embodiments, the moisture management fabric comprises one layer or region. In these embodiments the fabric comprises a moisture transfer gradient increasing in hydrophilicity from one side of the fabric to the other side of the fabric.

Also presented herein is a garment made up of the moisture management fabric disclosed throughout the specification.

Some embodiments provide a method of producing a moisture management fabric comprising the steps of producing an inner layer, an intermediate layer and an outer layer, wherein the inner layer is less absorbent than the outer layer, and wherein the intermediate layer comprises a hydrophilicity gradient increasing in the direction of the inner layer to the outer layer; and combining the inner layer, intermediate layer and the outer layer to form a moisture management fabric.

Other aspects and advantages of embodiments of the invention will be apparent from the following description and the appended claims.

BRIEF DESCRIPTION OF THE DRAWINGS

FIG. 4a is a Fourier Transform IR (FTIR) spectrum of COT (normal cotton), C0.5 (cotton treated with 0.5M MCAA), C1.0 (cotton treated with 1.0 M MCAA), C1.5 (cotton treated with 1.5 M MCAA) and C2.0 (cotton treated with 2.0 M MCAA) after treatment with 0.1M HCl;

FIG. 4b is a Fourier Transform IR (FTIR) spectrum of the samples of FIG. 4(a) after immersion in 0.1 M NaOH solution;

FIG. 9a is a surface morphology of an untreated cotton fiber as observerd by AFM;

FIG. 9b is a surface morphology of a cotton fiber surface-modified with nanofibers according an example embodiment of the present invention as observed by AFM;

DETAILED DESCRIPTION

Figure 1:
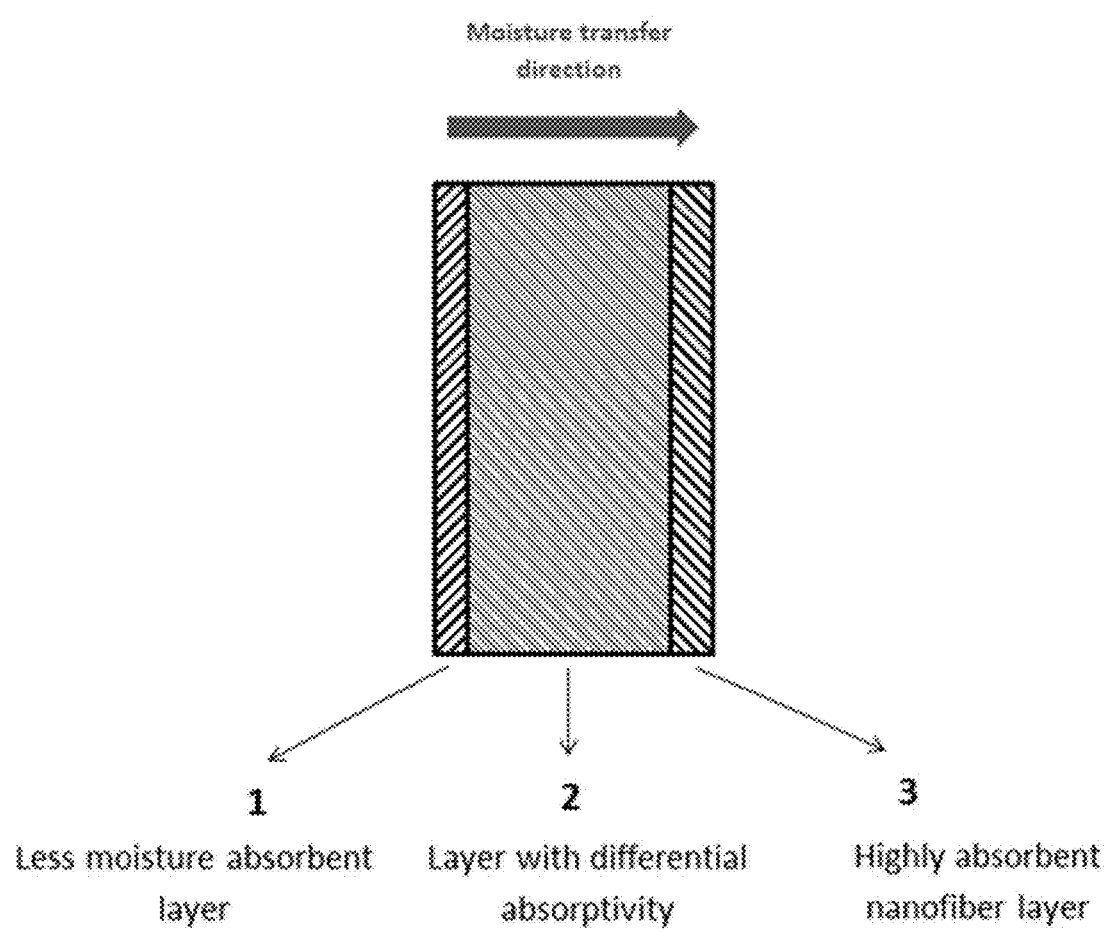
FIG. 1 is a moisture management fabric according to an example embodiment of the present invention.

The embodiments presented herein are for a moisture management fabric, a method of making such a fabric, and a garment made from a moisture management fabric.

After reading this description, it will become apparent to one skilled in the art how to implement the invention in various alternative embodiments and alternative applications. However, although various embodiments of the present invention will be described herein, it is understood that these embodiments are presented by way of example only, and not limitation. As such, the detailed description of various alternative embodiments should not be construed to limit the scope or the breadth of the invention.

"Moisture management" as used herein is the controlled movement of water vapor (moisture) and liquid water (perspiration) from the surface of the skin of the wearer of the fabric to the atmosphere through the fabric. The embodiments provided herein have several advantages. For example, these embodiments help create a comfortable microclimate between the skin and the fabric, help avoid a wet feeling fabric, help avoid a sticky feeling fabric, and help efficiently transport moisture from the skin through the fabric to the atmosphere.

In general, currently available methods of moisture management employ mainly nylon (polyamide) or polyester fibers. Since these fibers are hydrophobic, those methods involve manipulation of hydrophobic fibers. However, fabrics made up of hydrophilic fibers such as cotton, or cellulose still remain the preferred choice for many consumers because of their desirable physical and chemical properties.

In particular, cotton fabrics possess a more pleasant feeling upon contact with the skin and are preferred for various reasons including the fact that they are a natural fiber and possess other desirable qualities over synthetic fibers. However, traditional cotton fibers absorb liquids secreted through the skin tissue and release them slowly to the atmosphere. As such, if the wearer is engaged in heavy physical activity, the cotton fabrics become excessively wet and impart a sticky sensation to the wearer, thus detracting from the wearer's comfort.

Although the discussion above is directed to cotton as an example of a hydrophilic fiber, the scope of the present invention is not so limited to cotton. The embodiments presented herein can be applicable, broadly, to any fabric with hydrophilic fibers. While some embodiments presented herein are directed to natural fibers such as cotton, cellulosic fibers, or fibers like wool, synthetic hydrophilic fibers can also be improved using the embodiments disclosed herein.

Accordingly, the present invention is directed to natural fibers and synthetic fibers and yarns, fabrics and end-uses thereof. Some particular embodiments presented herein are directed to natural fibers. Some such embodiments are directed to cellulosic fibers. Some other such embodiments are directed to cotton fibers.

Three-Layered Moisture Management Fabric Embodiment

In some embodiments, the layered moisture management fabric comprises three layers.

FIG. 1 illustrates a three-layered moisture management fabric according to one embodiment of the present invention. In some embodiments, other layers such as backing layers, coating layers and the like can be included without changing the inventive concept of the present invention. For example, it is contemplated that a garment created with the three-layered moisture management fabric of this embodiment could be placed within an outer, protective shell that could be used, for example, as a rain barrier or rain jacket.

Accordingly, as shown in FIG. 1, the three-layered moisture management fabric comprises an inner layer 1, an intermediate layer 2 with differential absorptivity and an outer layer 3. Inner layer 1 is in contact with the wearer's skin, while the outer layer 3 is positioned towards the outside environment. In other words, outer layer 3 makes up the outer surface of the fabric. The intermediate layer 2 is in between the inner layer 1 and the outer layer 3.

According to the embodiments presented herein, the moisture is transported from the inner layer 1, through the intermediate layer 2, to the outer layer 3, i.e., from the skin surface to the outside environment. All layers, 1, 2, and 3 comprise hydrophilic fibers.

According one embodiment, the inner layer 1 is less moisture absorbent than the outer layer 3. In such embodiments, although the inner layer 1 is less moisture absorbent, it is highly permeable to moisture.

In some embodiments, the inner layer 1 comprises a fabric treated with at least one dispersion of a nanomaterial. In some embodiments, these nanomaterial dispersions can modulate the absorptive properties of the hydrophilic fibers in the inner layer 1. In some embodiments, these nanomaterial dispersions are nanomaterial coatings on the hydrophilic fibers. In some embodiments, the nanomaterials are metallic compositions.

Titanium dioxide can be used as a nanomaterial dispersion in some embodiments. $TiO_2$ can be applied as a colloidal dispersion on a fabric surface. Any techniques known in the art can be used to make such a dispersion. For example, colloidal dispersions of $TiO_2$ can be made with surfactants to aid in dispersing. In some other instances, colloidal dispersions of $TiO_2$ can be made without surfactants, and in such instances ultrasound or nucleating nanoparticles can be used to aid in dispersing. Typical concentrations of nanoparticles used in embodiments were in the range of 1% to 10% (w/w). The nanoparticle dispersion can be applied on the surface of the fabric by using any of the techniques known in the art, such as spraying, roller coating, kiss coating etc. The nanoparticle dispersion coating process is followed by a drying process to secure the nanoparticles on to the fiber surface. Any metals or agents that can modulate the absorption properties of the inner layer can be used in the embodiments of the invention. For example, substances with similar properties to those of titanium dioxide like metal oxides, metal sulfides, metal chlorides, metal fluorides, metal iodides, silicons, polysaccharides, or carbon nanostructures (nanotubes, graphene, graphite, fullerenes) can be used in some embodiments. The only requirement is that the nanomaterial dispersion is hydrophobic with a high ability to wick moisture. For the purposes of this invention, these materials are known as "hydrophobic nanoparticles". In some embodiments, the nanomaterial dispersion can be applied on the surface of the fabric closest to the wearer's skin. In some embodiments, the nanomaterial can be blended with the hydrophilic fibers in the inner layer 1.

The intermediate layer 2 can have differential absorptivity. The "differential absorptivity" in this context means that the absorption properties of the intermediate layer vary across the width of the intermediate layer 2. In other words, there is an absorption gradient across the intermediate layer 2, with the portions of layer 2 closest to inner layer 1 being less absorbent than the portions of layer 2 that are nearer to the outer layer 3. Such an absorption gradient can be created by establishing a hydrophilicity gradient across the intermediate layer 2. The hydrophilicity gradually increases across the intermediate layer. In this context, the terms "absorption gradient" and the "hydrophilicity gradient" are used synonymously with each other.

Many techniques can be used to impart such a hydrophilicity gradient/absorption gradient across the intermediate layer 2. These techniques can include physical and chemical methods. For example, fibers can be arranged in such a way to present both macro- and micro-capillaries (pores and spaces) to provide pathways or a capillary network such that the moisture can travel through the layer. Accordingly, the intermediate layer can be engineered to possess such a physical network that imparts a hydrophilicity gradient/absorption gradient.

According to some embodiments of the invention, a hydrophilicity gradient across the layer can be established by chemical means. Accordingly, agents that can modulate the absorption/hydrophilicity can be incorporated into the intermediate layer using chemical methods. This can be done by incorporating such agents in varying concentrations to the intermediate layer. In other words, this can be done by creating a concentration gradient of an appropriate chemical agent across the intermediate layer. The "concentration gradient" in this context means that the concentration of the appropriate agent varies as a gradient across the intermediate layer. Accordingly, in some embodiments, in the intermediate layer, there is a higher concentration of the agent close to the outer layer 3 and a lower concentration close to the inner layer 1. In these embodiments, the moisture absorption capability increases in layer 2 from the area closest to the inner layer 1 to the area closest to the outer layer 3. In other words, such an arrangement can create a moisture absorption gradient, increasing absorptivity from inner layer end to the outer layer end. In this regard, the terms "moisture absorption gradient" and "hydrophilicity gradient" can be used interchangeably.

In some embodiments, such a chemical modification can be achieved by carboxymethylation of the cellulose fabric fibers. Generally, carboxymethylation increases the hydrophilicity of the treated fibers. The carboxymethylation can be achieved by treating the fabric (fibers) with a mixture of monochloroacetic acid (MCAA) and sodium hydroxide. According to one embodiment, the fabric is sprayed or kiss-coated on one side of the fabric with a solution of monochloroacetic acid and sodium hydroxide until the fabric obtains a wet pickup of 150%. Then the solution is allowed to travel through the fabric from one end to the other, such that a concentration gradient of carboxymethylated fibers is established across the fabric thickness/width.

Figure 2:
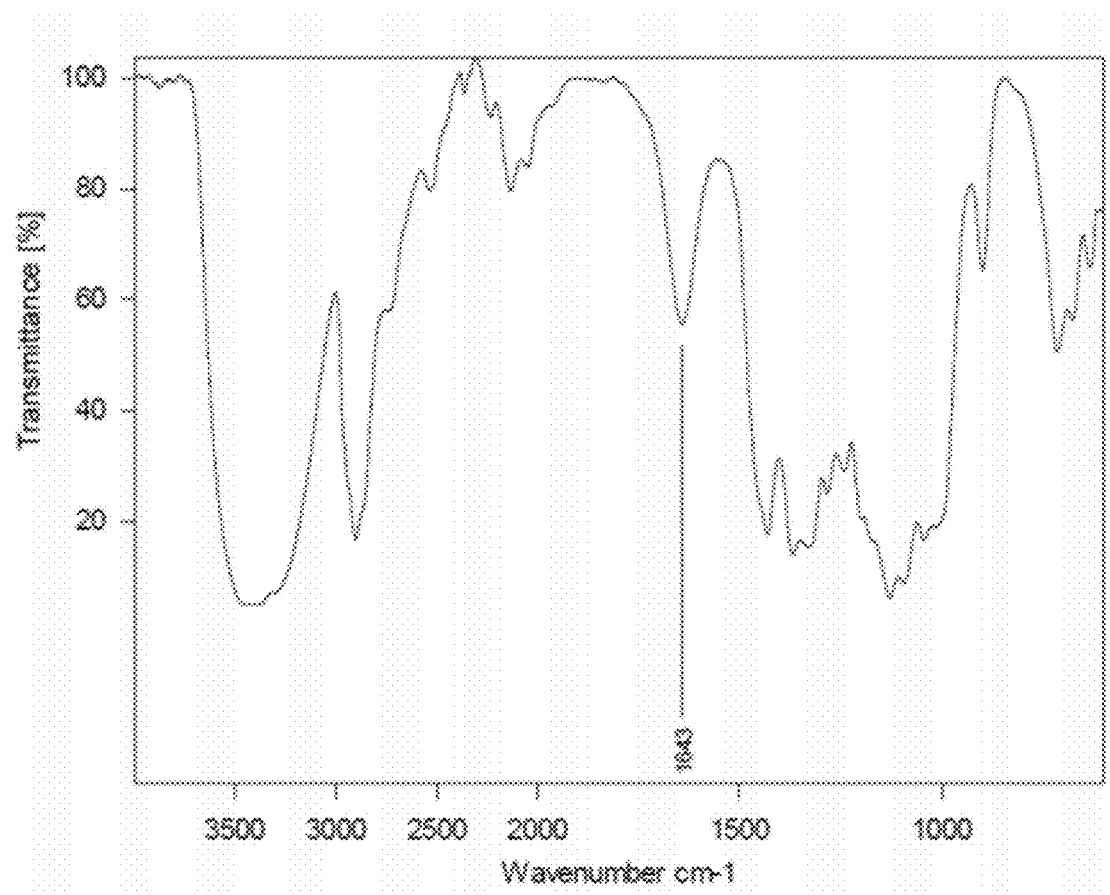
FIG. 2 is a Fourier Transform IR (FTIR) spectrum of an untreated cotton fabric.
Figure 3:
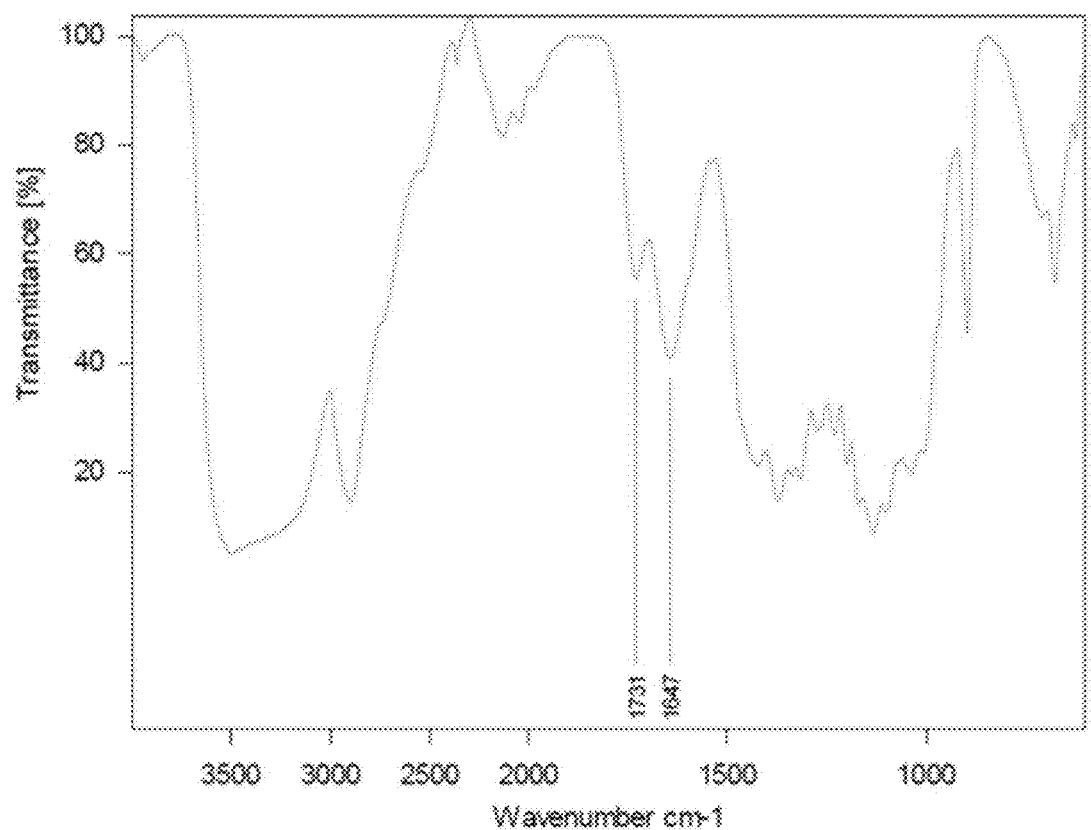
FIG. 3 is a Fourier Transform IR (FTIR) spectrum of MCAA treated cotton fabric according to an example embodiment of the present invention.

The carboxymethylation can be characterized by any analytical techniques known in the skill of art. For example, Fourier Transform IR spectra can be used for this purpose. For example, FIGS. 2 and 3 show FTIR spectra for cotton fabric and MCAA modified cotton fabric. The major peak assignments are listed in Table 1.

TABLE 1

FTIR peak position assignments for cotton and MCAA treated cotton

| Cotton | | MCAA treated cotton | |
| --- | --- | --- | --- |
| Peak ($cm^{-1}$) | Assignment | Peak ($cm^{-1}$) | Assignment |
| 3406 | Alcoholic —OH stretching | 3421 | Combined absorption of carboxylic —OH stretch and alcoholic —OH stretch |
| 2902 | Aliphatic —$CH_2$ stretching | 2902 | Aliphatic —$CH_2$ stretching |
| 1430 | Aliphatic —$CH_2$ bending | 1734 | —C═O stretch of carboxylic group |
| 1338 | —OH in plane bending | 1594 | —C═O stretch of carboxylate anion |
| 1642 | —OH bending of absorbed water | 1642 | —OH bending of absorbed water |
| 1110 | —C—O—H bending of secondary alcoholic | 1337 | —OH in plane bending |
| 1043 | —C—O stretching | 1044 | —C—O stretching |
| 900 | Asymmetric out of plane β-glucosidic bond stretch | 898 | Asymmetric out of plane β-glucosidic bond stretch |

The peak at 1731 $cm^{-1}$ indicates the carbonyl functional group of the carboxylic acid in MCAA treated samples. At appropriate pH values, e.g., basic pH, the carboxylic acid groups will be deprotonated to carboxylate groups. The peak at 1731 $cm^{-1}$ completely disappears when treated with 0.1 M NaOH solution. A new peak appears at around 1594 $cm^{-1}$, which can be assigned to carboxylate carbonyl.

Different degrees of chemical modification across the intermediate layer 2 can also be verified using FTIR spectra taken at two sides of the treated cotton fabric. See FIG. 4. The absorbance ratio of the carboxylic peaks at 1732 $cm^{-1}$ for the fabric surface on which the reactant solution is sprayed and the opposite surface is approximately 1.3, while that ratio for carboxylate absorption is approximately around 1.0. An absorption ratio higher than 1 for the carboxylic carbonyl indicates different degrees of chemical modification across the fabric. For example, in the present case, the absorbance ratio of 1.3 indicates that there are more carboxymethylated cellulose fibers on the surface where the reactant solution is sprayed than that of the opposite surface. Several other methods known to those of ordinary skill in the art that are alternative to carboxymethylation that can create such hydrophilicity gradient can be used in a similar manner.

In some embodiments, the outer layer 3 has a higher moisture absorption capacity than the inner layer 1. In some embodiments, the outer layer comprises nanofibers. In some embodiments, the nanofibers are incorporated into the outer layer. In some other embodiments, the nanofibers are incorporated on to the surface of the outer layer. The "surface of the outer layer" in this context means the surface that is in contact with the outside environment. In such embodiments, the nanofibers can be coated on to the surface of the outer layer. In some embodiments, the nanofibers are grafted on to the surface of the outer layer.

In some embodiments, the nanofibers are selected such that their incorporation changes the properties of the outer layer. In some embodiments, the nanofibers can change the hydrophilicity of the outer layer. In some other embodiments, the nanofibers can change the moisture absorbing capability of the outer layer. In some embodiments, the nanofibers are hydrophilic. In some embodiments, the nanofibers are moisture absorbing. In some other embodiments, the nanofibers have moisture absorbing and hydrophilic properties.

Some embodiments of the present invention provide a moisture management fabric comprising chitosan or chitin nanofibers incorporated into the outer layer. In some embodiments, chitosan or chitin nanofibers are grafted on to the surface of the outer layer. In some embodiments, the outer layer fabric comprises nanofiber concentrations of 0.25 g/l, 0.50 g/l, or 0.75 g/l. In some other embodiments, the outer layer fabric comprises the nanofibers in the concentration range of about 0.25 g/l to about 0.75 g/l. In some other embodiments, the outer layer comprises a nanofiber concentration of at least about 0.25 g/l. Table 3 shows the surface roughness properties of the nanofiber grafted outer layer surface as calculated using AFM.

TABLE 3

Surface roughness parameters as calculated by AFM

| Samples | $R_a$ | $R_{ms}$ | $R_{sk}$ | $R_{ku}$ |
|---|---|---|---|---|
| Untreated cotton | 102.3 ± 22 | 117.6 ± 32 | 0.181 ± 0.073 | 2.006 ± 0.42 |
| Cotton modified with CNF | 13.1 ± 3 | 16.3 ± 3 | −0.318 ± 0.121 | 2.572 ± 0.145 |

$R_a$: Average roughness in nm
$R_{ms}$: Root mean square roughness in nm
$R_{sk}$: Skewness
$R_{ku}$: Kurtosis Accordingly, one embodiment of the present invention is a moisture management fabric comprising an inner layer, an intermediate layer comprising a differential absorptivity (moisture absorption gradient, which goes from lower hydrophilicity to higher hydrophilicity across the thickness of the layer from the side of the inner layer to the side of the outer layer), and an outer layer comprising any one of the nanofiber concentrations between 0.25 g/l and 0.75 g/l.

The fabric according to the embodiments disclosed herein has improved moisture management properties. For example, in some embodiments, the fabric can have at least one of the properties selected from the group consisting of improved wicking, improved moisture spreading, improved directional movement of moisture and improved moisture pickup ratio.

As used herein, "improved wicking" means that the fabrics of the present embodiments have better wicking ability than the fabrics comprising unmodified hydrophilic fibers. For example, the wicking can be compared with fabrics comprising untreated cotton fibers and fabrics according to the embodiments of the present invention.

Figure 10:
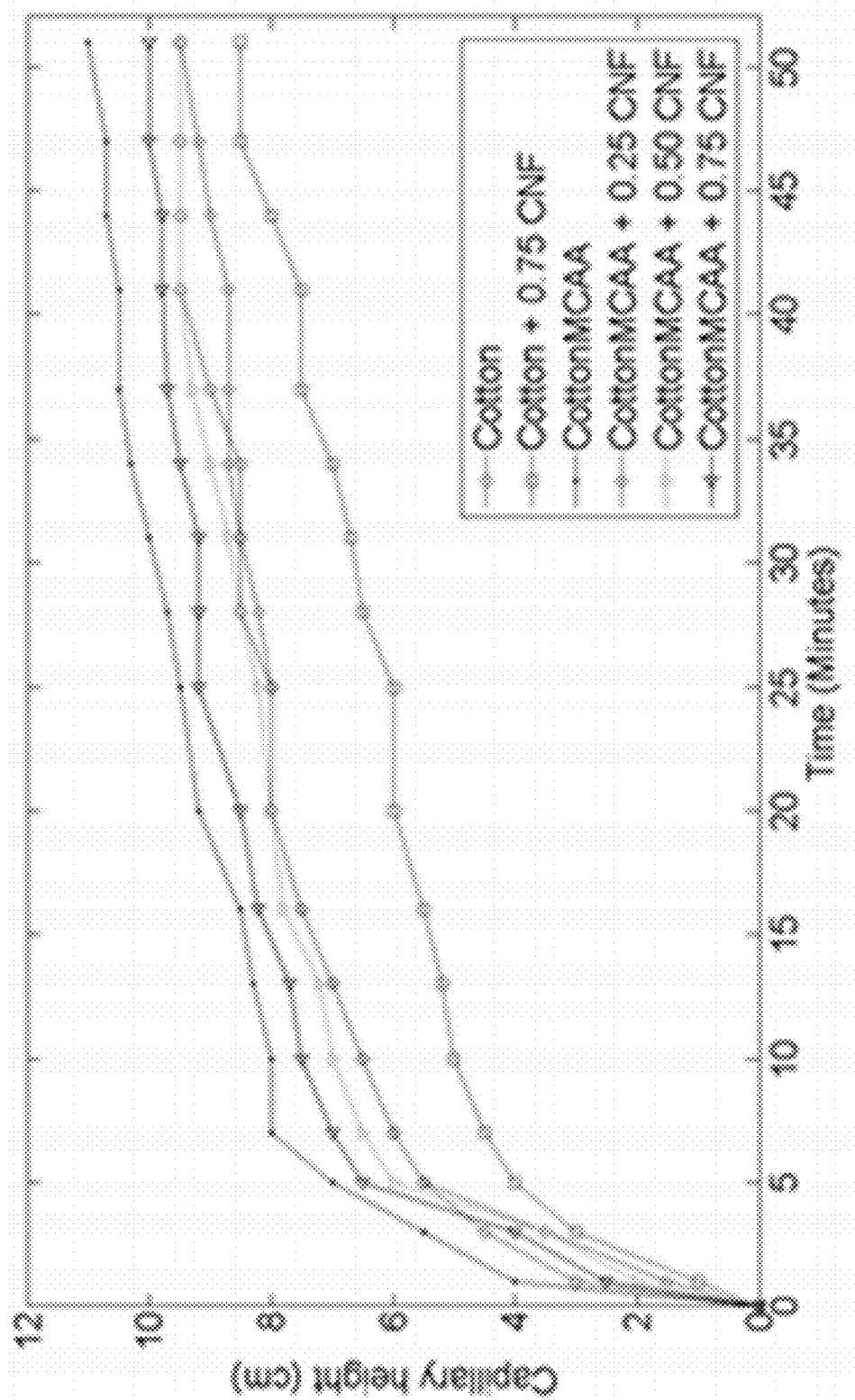
FIG. 10 is a vertical capillary height to water taken at different times for different fabric systems according to example embodiments of the present invention.

FIG. 9 illustrates a wicking height taken at different times for untreated fabric and fabrics modified according to the embodiments provided herein. FIG. 10 illustrates the log L versus log T plot for the wicking test data for unmodified fabrics and fabrics modified with MCAA and nanofibers. Accordingly, untreated cotton fabrics and cotton fabrics treated with MCAA follow a plot indicating rapid moisture/water diffusion into the fibers. In contrast, fabrics modified with nanofibers display a more gradual diffusion of moisture/water. This may allow the capillary radius to change with time, and allow the absorption of more moisture/water into the fibers and through the fabric. Accordingly, some of the present embodiments may allow the capillary radii of the fabric to change with time. In contrast, a fabric comprising untreated hydrophilic fibers such as untreated cotton fibers, would absorb moisture immediately resulting an immediate change in the capillary radii. However, if the capillary radii are allowed to change over time, then such fabrics can absorb more moisture, and can have better moisture management properties.

According to FIGS. 9 and 10, a highest initial rate of wicking was observed for fabrics modified with MCAA. It is proposed that the incorporation of carboxylic acid groups to the surface of the fiber increases the hydrophilicity of the fiber. As such, the surfaces of the MCAA treated fibers are more hydrophilic compared to the surface of the untreated cotton fibers. Surprisingly, cotton fibers modified with chitin nanofibers show the lowest wicking rate. It was expected at the outset that the hydrophilic chitin nanofibers may contribute to a higher wicking rate. These unexpected results may be due to the excessive swelling of the nanofibers during the capillary rise, thus compromising the wicking rate. The fabrics comprising a layer of MCAA treated cotton fibers and a layer of cotton fibers comprising nanofibers show a wicking rate similar to the wicking rate of untreated cotton fibers. It is advantageous to have a wicking rate closer or similar to that of untreated cotton fibers so that the moisture can be quickly absorbed.

Increased wicking rate is an important parameter in improving the moisture management properties. However, the absorbed moisture must be transported across the fabric efficiently. As such, water spreading ability of a fabric is an important property of a fabric, since it determines how rapidly the fabric can adjust the water concentration gradient. If the fabric has a low moisture spreading character, then the fabric may feel damp and become uncomfortable to the wearer. Also, because of the high localized concentrations of water, humidity levels at the microclimate between the skin and the fabric can increase. This can significantly affect the drying rate, thermal conductivity and the moisture vapor transmission rate of the fabric. This has traditionally been one of the limiting factors of fabrics made up of hydrophilic fibers such as cotton fibers.

Figure 11:
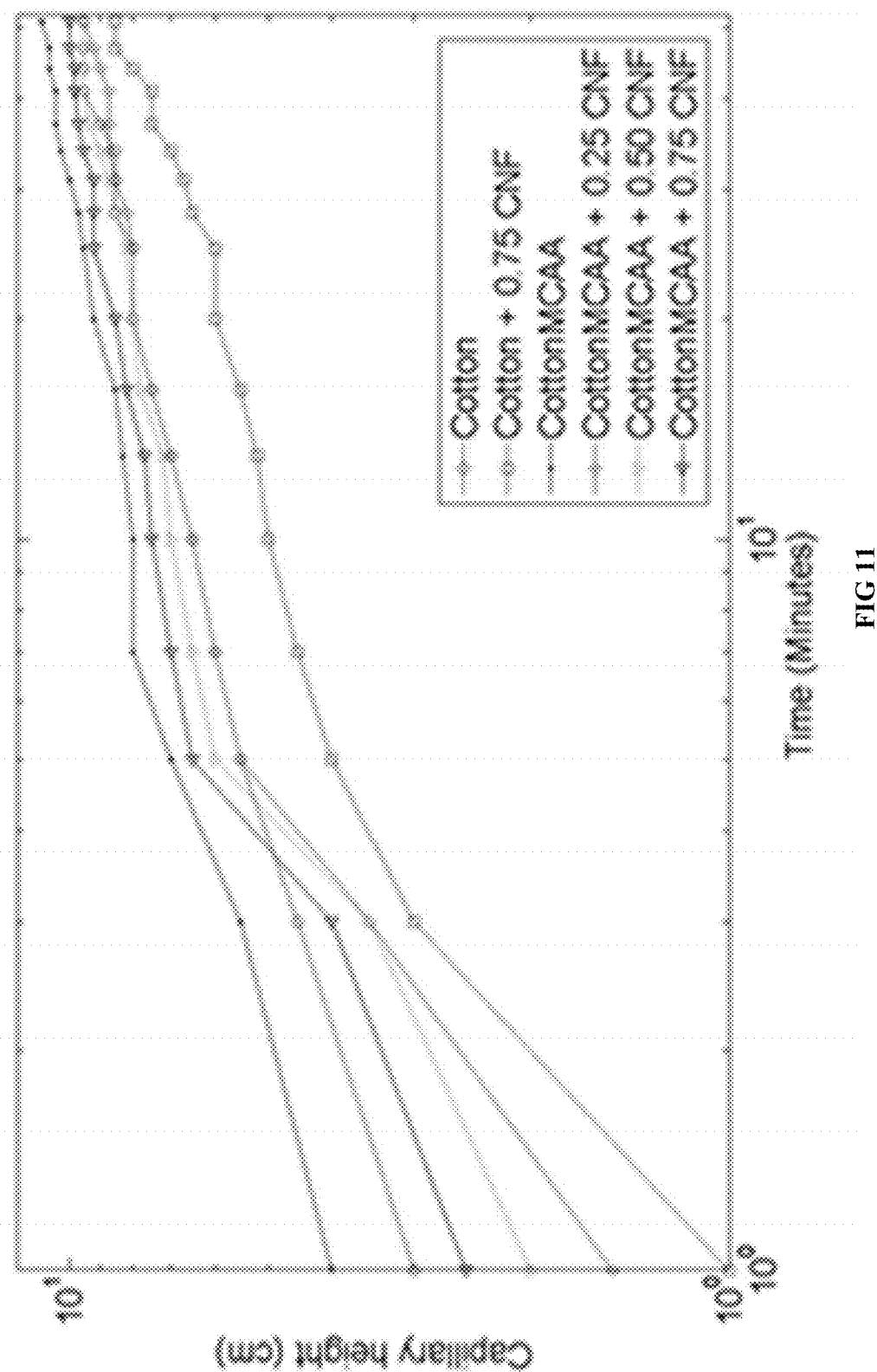
FIG. 11 is a Log capillary height v. Log time curve for different fabric systems according to example embodiments of the present invention.

FIG. 11 shows the water spreading ability of the fabrics according to example embodiments of the present invention. Accordingly, fabrics with untreated cotton fiber show the lowest water spreading ability. This low water spreading ability is associated with the well-known poor moisture management properties of the fabrics made up of untreated cotton fiber. Fabrics treated with nanofibers show increased water spreading ability. Fabrics treated with MCAA also show a higher rate of water spreading ability. Fabrics treated with MCAA and grafted with nanofibers show an increased water spreading ability. Their water spreading ability is substantially higher than the fabrics with untreated cotton fiber.

The most important property of a moisture management fabric is its ability to wick the moisture from inner surface to the outer surface. Accordingly, a fabric having good moisture management properties must be able to pick up moisture from the skin surface and must be able to transport this moisture from the inner surface to the outer surface of the fabric. This directional movement of moisture can be improved by increasing the wicking rate of the inner layer. As provided herein, a fabric having a layer of MCAA treated fibers has an increased wicking ability. See FIGS. 9 and 10. Additionally, a fabric having a layer of MCAA treated cotton fibers and a layer grafted with nanofibers shows an increased water spreading ability. See FIG. 10.

A wet isolation ability test quantifies the available moisture that can be picked up from the inner surface of the fabric after it has been wetted, and sufficient time is allowed to transfer the liquid from inner surface of the fabric to the outer surface. The weight of the moisture available for pick up from the inner surface compared to the initial weight of the water applied to wet the fabric is calculated and given as Moisture Pickup Ratio MPR (%). If the MPR % is higher for the fabric, it indicates that the fabric has low directional transport properties since lesser amount of water has been transferred across the fabric.

Figure 12:
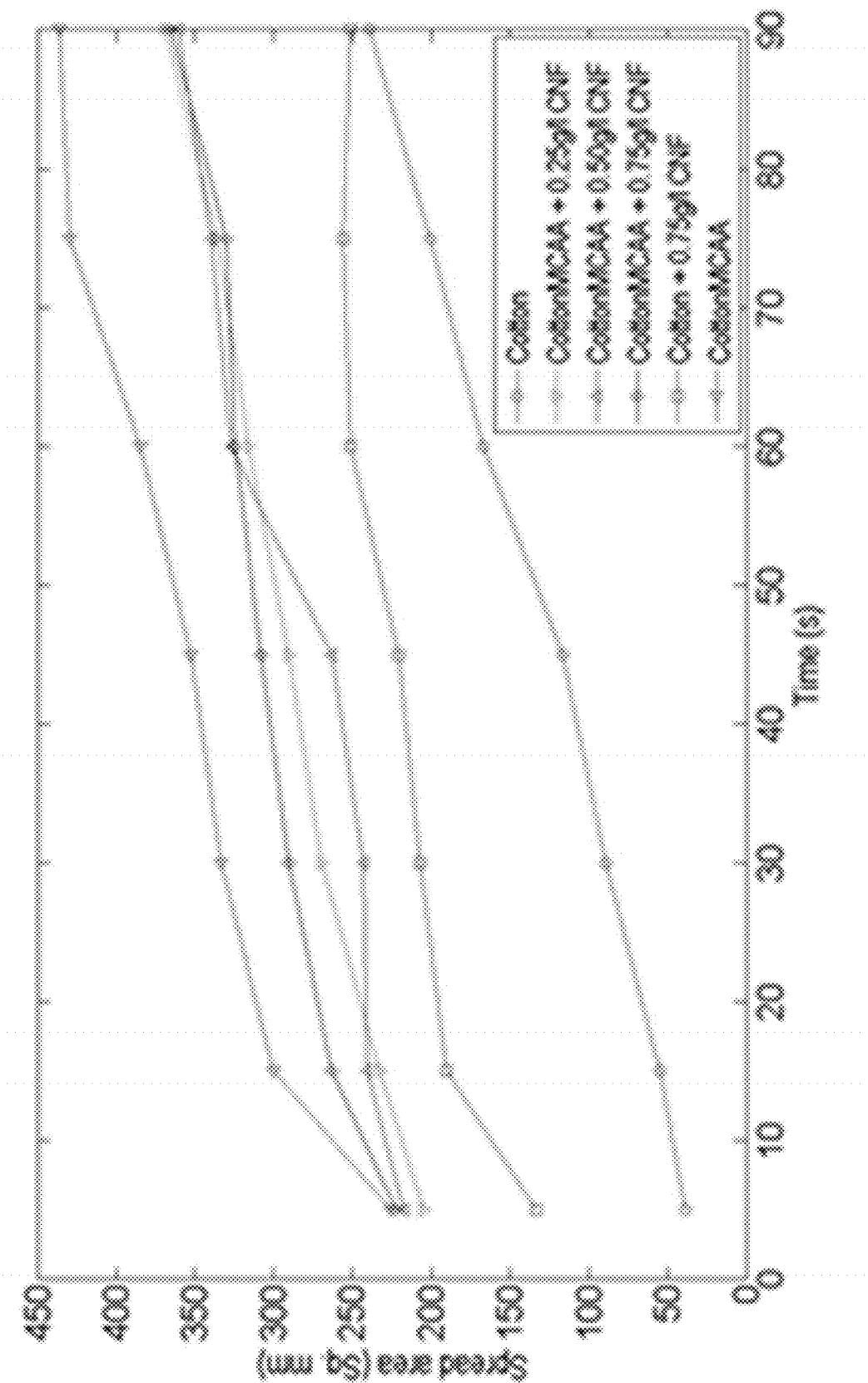
FIG. 12 is a water spreading area v. time for different fabric systems according to example embodiments of the present invention.

FIG. 12 illustrates the MPR(%) for different fabrics according to the example embodiments of the present invention. Fabrics with untreated cotton fibers have the lowest directional transport properties (highest MPR % of about 26%). Such fabrics can only transport about 75% of water through the fabric after wetting. Fabrics modified with MCAA show an improved directional transport (lower MPR % of about 15%). Such fabrics can transport about 85% of the water through the fabric structure.

Fabrics with untreated cotton fibers grafted with nanofibers show a better directional transport than the fabrics with untreated cotton (and lower MPR % of about 19%). Surprisingly an unexpectedly, the fabrics treated with MCAA and grafted with nanofibers show the optimal directional transport ability. Such fabrics show MPR % of about 8% to about 11%. The fabrics with MCAA treated cotton fiber layer and a layer grafted with nanofibers of about 0.75 nanofiber concentration shows an MPR % of about 8%. Accordingly, some embodiments of the present invention include fabrics having an MPR % of about 8% to about 11%. Some other embodiments include fabrics having an MPR % of less than about 11%.

In comparison with fabrics having fibers grafted with nanofibers and fabrics having fibers treated with MCAA, the low MPR % for the fabrics with a layer of fibers grafted with nanofibers and a layer of MCAA treated fibers is unexpected and surprising. Fabrics with a layer of MCAA treated fibers show a better MPR % than the fabrics with untreated cotton fibers. It is observed that fabrics with nanofiber grafted cotton fibers show a higher MPR % than that of fabrics with a layer of MCAA treated fibers. Accordingly, combination of the two is expected to produce a fabric with MPR % less than a fabric with a layer of untreated cotton fibers, but with a higher MPR % than that of a fabric with a layer of MCAA treated cotton fibers. However, as shown in FIG. 12, the combination of a layer of MCAA treated cotton fibers and a layer of nanofiber grafted cotton fibers produced a fabric with the lowest MPR %; surprisingly, substantially lower than a fabric with a layer of cotton fibers treated with MCAA. This can only be explained by a synergistic effect of the combination of a layer with MCAA treated fibers and a layer with nanofiber grafted cotton fiber. It is possible that this combination provides the optimal levels of moisture wicking ability, moisture spreading ability, directional transport of moisture, hydrophilic functional groups and capillary transport that can improve the moisture management properties. Accordingly, the present embodiments provide fabric structures comprising at least one or all of the above properties.

Two Layered Moisture Management Fabric Embodiments

Other embodiments comprise a two-layered fabric structure comprising an inner layer and an outer layer. In some such embodiments, the inner layer comprises hydrophilic fibers. In some embodiments, the hydrophilic fibers are chemically or physically modified to create a hydrophilic gradient across the width of layer. In some embodiments, the hydrophilic gradient is created by including different levels of chemical modifications/chemical agents. Accordingly, in some embodiments, the concentration of chemical agents is lower at the surface close to the skin and greater at the surface close to the outer layer. In some embodiments, the cotton fibers are treated with MCAA. In some such embodiments, the MCAA concentration is higher at the surface near the skin surface and lower at the surface close to the outer layer. As such, in some such embodiments, the inner layer comprises a differential absorptivity of moisture.

The outer layer of these embodiments comprises a layer comprising nanofibers. In some such embodiments, the nanofibers are grafted, dispersed or coated on the outer surface (surface that is in contact with the outside environment). In some such embodiments, the nanofibers are selected such that they have at least one of the properties of hydrophilicity and moisture absorbency. Any nanofibers known in the art that could satisfy the above properties can be used in the present embodiments. In some embodiments, the nanofibers are cellulosic nanofibers. Any known cellulosic nanofibers can be used for this purpose. The terms "cellulosic nanofibers" and "cellulose nanofibers" are used herein interchangeably. The nanofibers can be synthetic or of natural origin. For example, the nanofibers can be bio-based based on plants (wood, cotton or vegetable biomass) or animals (mainly in exoskeleton of crustacean species). The nanofibers can also be produced from genetically engineered algae and bacteria. In some embodiments, the nanofibers are chitin nanofibers. In some embodiments, the nanofiber concentration is at least about 0.25 g/l. In some other embodiments, the nanofiber concentration is at least about 0.50 g/l. In some other embodiments, the nanofiber concentration is at least about 0.75 g/l. In some other embodiments, the nanofiber concentration is between about 0.25 g/l to about 0.75 g/l.

Some other embodiments include a moisture management fabric comprising a first layer comprising hydrophilic fibers and a second layer comprising hydrophilic fibers. In these embodiments, the first layer is proximal to a wearer's skin surface. The first layer comprises nanoparticle dispersion as discussed above. In some embodiments, the nanoparticles are incorporated into the surface of the first layer proximal to the wearer's skin. The inner surface is in contact or proximal to the wearer's skin. In some embodiments, the nanoparticle dispersion is a colloidal dispersion of $TiO_2$. In other embodiments, as discussed above, substances with similar properties to those of titanium dioxide like metal oxides, metal sulfides, metal chlorides, metal fluorides, metal iodides, silicons, polysaccharides, or carbon nanostructures (nanotubes, graphene, graphite, fullerenes) can be used.

In these embodiments, a second layer more absorbent than the first layer is connected to the surface of first layer that is directly opposite surface that is in contact/proximal to the skin surface. In these embodiments, the second layer comprises an inner surface and an outer surface. The outer surface is proximal to or in contact with the outside environment. In these embodiments, the second layer comprises hydrophilic nanofibers. In some embodiments, the nanofibers are cellulose/cellulosic nanofibers. In some embodiments, the nanofibers are incorporated onto the outer surface, for example, by grafting. In some of these embodiments, the nanofiber comprising the outer layer is chitin or chitosan nanofibers. In some such embodiments, the concentrations of the nanofibers on the outer surface of the outer layer are between 0.25 g/l and 0.75 g/l.

Other embodiments provided herein include a moisture management fabric comprising a first layer comprising hydrophilic fibers and a second layer comprising hydrophilic fibers. In these embodiments, the first layer is proximal to a wearer's skin surface. The first layer comprises nanoparticle dispersion as discussed above. In some embodiments, the nanoparticles are incorporated into the surface of the first layer proximal to the wearer's skin. The inner surface is in contact or proximal to the wearer's skin. In some embodiments, the nanoparticle dispersion is a colloidal dispersion of $TiO_2$. In other embodiments, as discussed above, substances with similar properties to those of titanium dioxide like metal oxides, metal sulfides, metal chlorides, metal fluorides, metal iodides, silicons, polysaccharides, or carbon nanostructures (nanotubes, graphene, graphite, fullerenes) can be used.

In these embodiments the outer layer comprises a hydrophilic gradient as discussed above. In these embodiments, the hydrophilic outer fiber layer comprises a hydrophilicity gradient that increases in hydrophilicity in the direction nearest to the inner layer to the outer surface, i.e., the inner surface of the second layer is less hydrophilic than the outer surface of the second layer. As discussed above, such a gradient can be established by incorporation of suitable chemical or physical agents. For example, a higher concentration of one or more chemical agents can be incorporated near the inner surface. In some such embodiments, the chemical agents can comprise MCAA. The concentration of the chemical agents can be decreased gradually across the outer layer. In other words, a concentration gradient of chemical agents can be established across the layer to obtain a hydrophilicity gradient.

Single Layer Moisture Management Fiber Embodiments

Some other embodiments provided herein include a single layer moisture management fabric comprising a hydrophilic fiber layer comprising an inner surface and an outer surface. The inner surface is proximal or in contact with a wearer's skin surface. The outer surface is in contact with the outside environment. In these embodiments, the hydrophilic fiber layer comprises a hydrophilicity gradient that increases from the inner surface to the outer surface, i.e., the inner surface is less hydrophilic than the outer surface. As discussed above, such a gradient can be established by incorporation of suitable chemical or physical agents. For example, a higher concentration of one or more chemical agents can be incorporated near the outer surface. The concentration of the chemical agents can be decreased gradually across the layer. In other words, a concentration gradient of chemical agents can be established across the layer to obtain a hydrophilicity gradient. In some such embodiments, the chemical agents can comprise MCAA. In some embodiments comprising cellulose fibers, such a gradient can be established by carboxymethylation. In such embodiments, a higher concentration of carboxymethylcellulose exists near the outer surface. Conversely, the concentration of carboxymethylcellulose near the inner surface is lower.

Garment and Textile Processing

The embodiments herein also provide a garment made up of a moisture management fabric, certain embodiments of which are disclosed throughout the specification. In an illustrative particular embodiment, the garment is made up of a layered moisture management fabric comprising an inner layer comprising hydrophilic fibers, an intermediate layer comprising hydrophilic fibers treated with MCAA according to embodiments presented herein, and an outer layer comprising nanofibers as disclosed above. In some embodiments, the garment is an active wear, sportswear or athletic wear garment. "Active wear" or "athletic wear" or "sportswear" in this context means garments that could be worn during athletic activities or activities involving physical movements. The garments can include shirts, skirts, dresses, shorts, pants, underwear, wristbands, headbands, socks, inner-linings of footwear and similar clothing items.

Some embodiments of the present invention provide a method of producing a moisture management fabric comprising the steps of producing an inner layer, an intermediate layer and an outer layer comprising hydrophilic fibers. The inner layer, which will contact with the skin surface, is less absorbent than the outer layer in contact with the outside environment. The intermediate layer comprises a hydrophilicity gradient increasing in hydrophilicity from the direction of inner layer to the outer layer. According to the embodiments of the invention, the hydrophilicity of the intermediate layer is lower near the surface close the inner layer, and greater near the surface close to the outer layer. In some embodiments, the inner layer, intermediate layer and the outer layer are combined to form a moisture management fabric. In some embodiments, the outer layer comprises nanofibers grafted on to the hydrophilic fibers. In some such embodiments, these hydrophilic fibers are on the surface of the outer layer. The surface of the outer layer is the surface that is in contact with the outer atmosphere and away from the wearer. In some embodiments of the invention, the outer layer comprises a nanofiber concentration of at least about 0.25 g/l.

Generally, current moisture management methods incorporate the moisture management technology at the manufacturing stage of the fabric or the yarn. For example, present methods improve the moisture management properties by fabricating fabrics with mixed polymers of synthetic and natural fibers. Also, other ingredients that can improve the moisture management properties are incorporated at the manufacturing stage. The present methods provide the added advantage that the moisture management properties according to present embodiments can be improved at the final stages of the textile processing. As such, methods of the present embodiments do not interfere with the complex manufacturing processes of the fabric.

FABRIC PREPARATION

Preparation of Less Moisture Absorbent High Wicking Surface (Layer No. 1 in Reference to FIG. 1)

Less moisture absorbent yet high moisture permeable surfaces are fabricated using colloidal $TiO_2$ dispersions on a fabric surface. Colloidal dispersion were made either by dispersing nanoparticle powders in an aqueous solutions with or without surfactants (depending on the nanomaterial) or using ultrasound or nucleating the nanoparticles in a solution phase. Typical concentrations of the nanoparticles used were in the range of 1%-10% (w/w). Then the nanoparticle dispersion was applied to one surface of the fabric either through spraying, roller coating, kiss coating, or similar means. The solution coating is followed by a drying process to secure the nanoparticles on to the fiber surface.
Preparation of Fabric Having Differential Absorptivity Across the Thickness (Layer No. 2 in Reference to FIG. 1)

Fabrics having differential surface absorptivity were prepared through a reaction process by maintaining different chemical concentrations across the fabric. This is simply achieved by spraying the fabric with a chemical solution on one side of the fabric and allowing the chemical solution to wick across the fabric followed by curing. When the chemical solution is sprayed on one side of the fabric it slowly wicks across toward the other surface of the fabric creating different concentrations of chemical solution through the fabric as it wicks through. When curing conditions are provided (examples of which are provided below), different degrees of chemical modification were achieved in the fabric, creating a hydrophilicity gradient across the fabric thickness. The method of chemical modification used is, while not limiting, carboxymethylation of cellulose, where a mixture of monochloroacetic acid (MCAA) and sodium hydroxide are reacted with cellulose to obtain carboxymethyl cellulose.

Experiment I

Scoured and bleached cotton fabric samples were used in the process. The fabric samples were anionically modified by slight carboxymethylation of cellulose using monochloroacetic acid (MCAA) treatment in an alkali medium. First, a reactant solution containing different concentrations of MCAA was prepared by dissolving in a 4.0 M sodium hydroxide solution. MCAA concentrations were 0.5 M, 1.0 M, 1.5 M, and 2.0 M. Then the reactant solution was sprayed on to one side of the fabric through a spray nozzle until the fabric attained a wet pickup of 150%. Then the fabric was transferred to a sealed polyethylene bag. The reaction progressed at 75° C.-80° C. for 30 min. Once completed, the fabrics were first washed with 1% acetic acid solution to remove excess alkali followed by a thorough washing with water.

Experiment II

Using the same concentrations described in Experiment I, samples were treated using spraying method to attain 150% wet pickup. Then the curing process was carried out at 100° C. for 10 min without covering with a polyethylene bag.

Experiment III

Experiment was carried out with the reactant solutions introduced in the Experiment I. One side of a fabric is coated using a method similar to kiss roll coating by applying the reactant solution with a foam lined pressure roller continuously fed with reactant solution. The final wet pickup of the fabric was kept at 150%. The fabric is then transferred to a sealed polyethylene bag and allowed for the reaction to occur at 75° C.-80° C. for 30 minutes. Alternatively, the fabric was heated at 100° C. for 10 min without being placed in a polyethylene bag. Once completed, the fabrics were first washed with 1% acetic acid solution to remove excess alkali followed by a thorough washing with water.

Experiment IV

Scoured and bleached cotton fabrics incorporating elastomeric yarn such as Spandex were used as the fabric samples in this experiment. Then the reaction procedure described in the Experiment I was carried out.

Experiment Results

FTIR studies were carried out to characterize the chemical modifications that occurred during the process. FIG. 2 and FIG. 3 show FTIR spectra for cotton fabric and MCAA modified cotton fabric, specifically the MCAA modified cotton fabric created in Experiment I above. Major peak assignments of the spectra are listed in TABLE 1. Peaks that are of most interest to embodiments of the present invention are at 1731 cm$^{-1}$ in MCAA treated cotton samples. The peak at 1731 cm$^{-1}$ indicates that the carbonyl functional groups in the polymeric structure of MCAA treated cotton. At appropriate pH values, carboxylic acid groups will be anionized to carboxylate groups rendering a negative charge on the cotton fibers.

The peak at 1734 cm$^{-1}$ in MCAA modified cotton fabrics disappears completely when immersed in 0.1 M NaOH solution, giving a new peak around 1594 cm$^{-1}$ which can be assigned to carboxylate carbonyl functionality. See FIGS. 4(a) and 4(b). This confirms the successful carboxymethylation reaction has taken place in the cotton sample.

Figure 5:
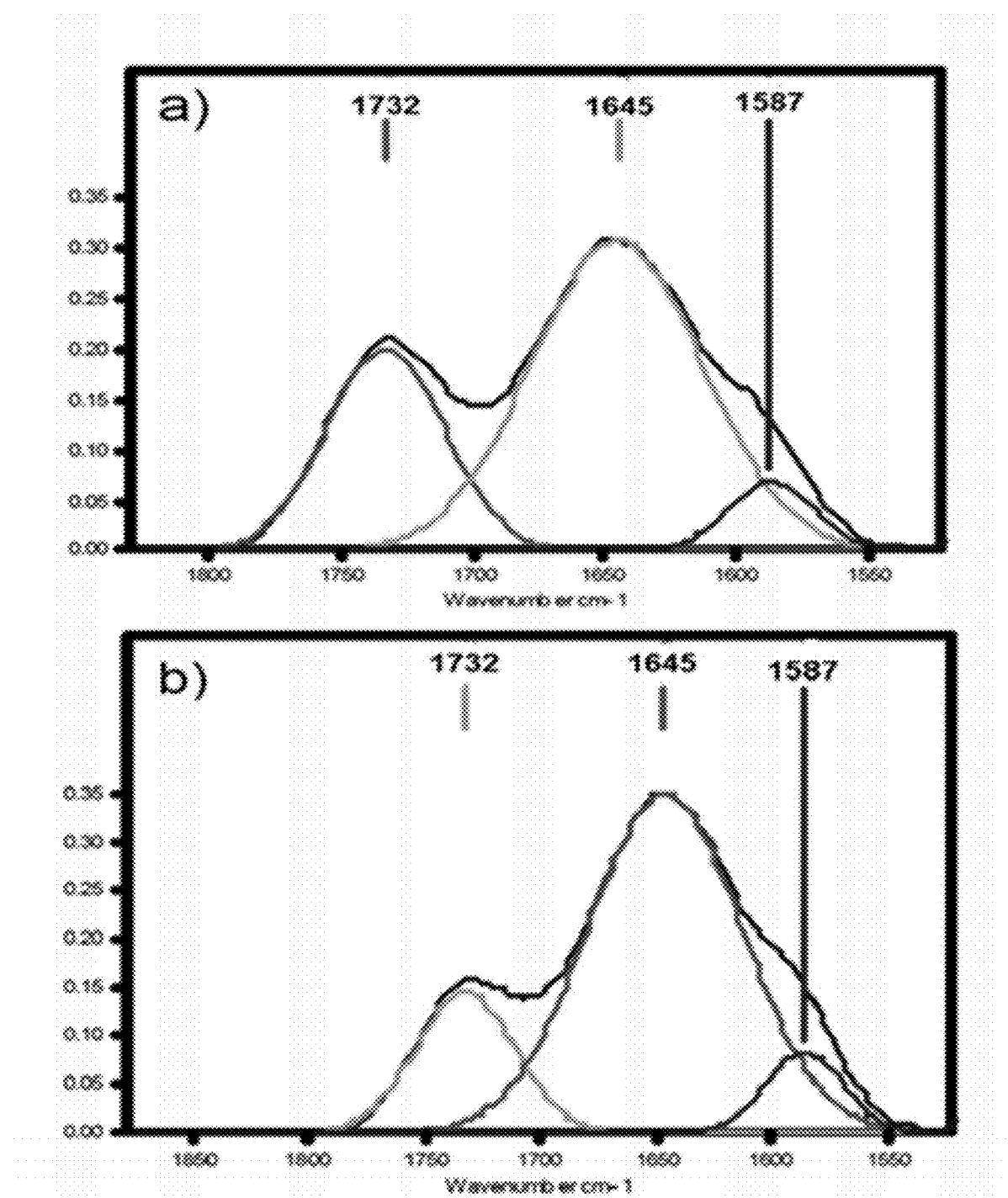
FIG. 5a is a Fourier Transform IR (FTIR) spectrum of a cotton fabric's side on which a reactant solution is applied.
FIG. 5b is a Fourier Transform IR (FTIR) spectrum of an opposite side of a cotton fabric on which a reactant solution is applied.

Different degrees of surface modification can also be observed using FTIR spectrum taken at the two sides of the same treated cotton sample. See FIGS. 5(a) and (b). The sample was equilibrated in a large amount of water with the pH value of 7 for 1 hour. The absorbance ratio between carboxylic absorption peaks at 1732 cm$^{-1}$ for the fabric surface to which reactant solution was sprayed and the opposite surface is approximately 1.3 and the ratio for carboxylate absorption is approximately around 1.0. Absorption ratio higher than the unity for carboxylic carbonyl indicates different degrees of surface modification across the fabric.

Grafting of Highly Absorbent Nanofiber Layer (Layer No. 3 in Reference to FIG. 1)

Grafting of highly absorbent nanofibers to the fabric was carried out using aqueous dispersions of nanofibers of varying concentrations. In this experiment, chitin nanofibers were used. As discussed above, other nanofibers can be used instead. Dispersions of nanofibers were prepared as described below. Dried nanofiber powder was added to 200 ml of water while stirring. Then the pH of the solution was adjusted to pH 5.0-5.5 using 0.1 HCl or 0.1 NaOH solution. The pH adjusted solution was sonicated for 5 min using a 24 kHz ultrasound probe to disperse the nanofibers. The solution changed from opaque to transparent during the sonication process indicating nanoscale dispersion of nanofibers.

The following concentrations (Table 2) were tested during the experiments:

TABLE 2

Concentrations tested for nanofiber grafting experiments

| Reference from hereon | Concentration |
| --- | --- |
| CNF 0.25 | 0.25 g/l |
| CNF 0.50 | 0.50 g/l |
| CNF 0.75 | 0.75 g/l |

Nanofibers were grafted to the fabric surface using two methods; an exhaust method and a spray method. Grafting of chitin nanofibers to cotton fibers using the exhaust method resembles a typical dyeing setup. Grafting was also carried out using a spray application.

Experiment I

Figure 6:
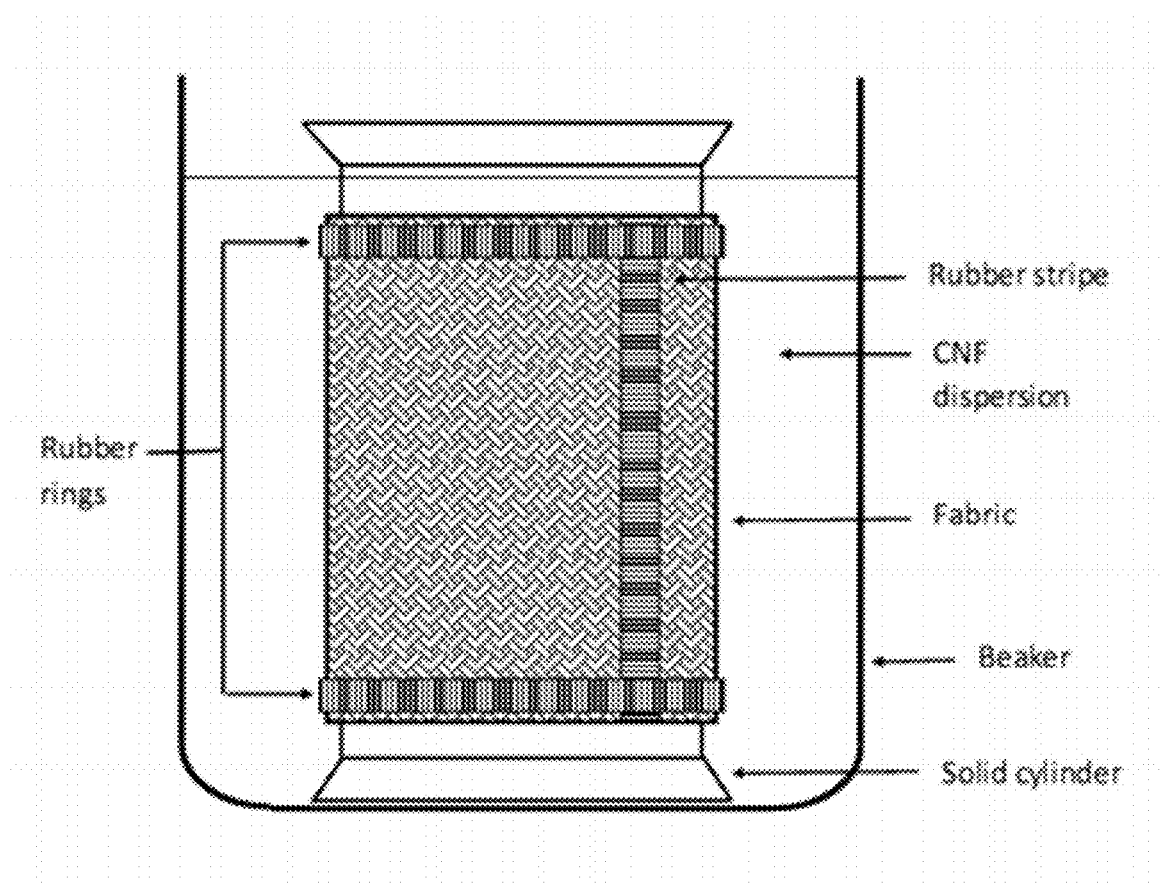
FIG. 6 is an apparatus for grafting nanofibers to the fabric.

Fabrics were grafted with CNF through a wet exhaustion process similar to dyeing. The experiment was carried out in such a way that the fabric to solution ratio is 1:15 (for 1 g of fabric 15 mL of solution). The grafting apparatus is shown in the FIG. 6. Fabric to be grafted with CNF was wrapped once around a Teflon lined solid cylinder secured with a rubber ring and edge closed with a rubber member. The solid cylinder was then placed inside a beaker. A chitin nanofiber dispersion having a concentration from one of the group of (0.25 g/l (CNF 0.25), 0.50 (CNF 0.5) g/l, and 0.75 g/l (CNF 0.75)) was prepared during the experiment from fully dried CNF. Before treating fabrics with CNF dispersions, the solution pH was adjusted to be within the range of 5-5.5 using 0.1 M HCl and 0.1 M NaOH solutions. For grafting, solutions were poured into the apparatus until the fabric was totally immersed in the chitin nanofiber dispersion. The solution was then heated to 80° C. for 1 hour followed by washing and then drying at 100° C.

Experiment II

Fabrics were grafted with CNF through a spray coating method, wherein a fabric is attached to a vertical surface for ease of spraying. The fabrics were positioned in such a way that the fabric face having the higher surface modification and thus higher hydrophilicity (after treatment with MCAA as described above) faced the area being sprayed. Nanofiber dispersions having different concentrations (0.25 g/l 0.50 g/l and 0.75 g/l) were sprayed from a commercial paint sprayer from a distance of 20 cm. Once completed, samples were dried at 100° C.

FABRIC CHARACTERIZAION

The microstructures of the CNF coatings were characterized using a Hitachi SU6600 Analytical Variable Pressure FE-SEM field emission scanning electron microscope (SEM). Samples were arranged as to observe the nanofiber layer. First, nanofibers were redispersed in ethanol and a drop of the dispersion was placed on the aluminum SEM sample holder and kept aside for evaporation of the solvent. SEM characterization of untreated and treated cotton fabrics was also carried out. The samples were sputter-coated with gold for 30 s at 15 mA prior to the observation.

Morphological characterization of the CNF was done using Atomic Force Microscope (AFM) using a Park Systems, XE-100 microscope. Imaging was carried out using noncontact mode cantilever, having a tip radius less than 10 nm operating at a frequency of 0.5 Hz. The CNF were first dispersed in water using ultrasound. Then a drop of the solution was placed on to a mica piece which was mounted on the scanning stage of the AFM. For imaging of fiber surfaces, untreated and treated fabrics were tightly mounted onto a sample holder using a double sided scotch tape which was then flattened using a load placed horizontally on top of the fabric. Then the fabric was mounted on the scanning stage.

Fourier transform infrared spectroscopy (FTIR) measurements were taken for CNF, cotton and modified cotton using (Bruker FT-IR Vertex 80). The CNF sample was placed inside the ATR chamber on top of the ZnSe crystal. A special tightening unit that came with the instrument was used to ensure the maximum contact between the crystal and the sample. For the fabrics, since they have an irregular surface, a diffuse reflectance assembly was used as it provides more intense signals. FTIR spectra were recorded between 4000 cm$^{-1}$ and 600 cm$^{-1}$ with the resolution of 4 cm$^{-1}$ in the absorbance mode for 128 scans at room temperature. The effect of the treatment on the vertical wicking of the fabric was measured using vertical the wicking test according to a standard test procedure (See Harnett P R and Mehta P N, *A survey and comparison of laboratory test methods for measuring wicking*, Text Res J, 1984 54 471). Test specimen having the dimensions of 200 mm×25 mm were cut having a longer length in the course direction (machine direction). Each sample was suspended on a horizontal bar having 30 mms of its bottom end immersed in a reservoir of distilled water. For contrast, a 1% reactive dye (reactive blue) was mixed with water. The height of leading edge of the water was measured with the aid of a fixed scale.

The drying rate was calculated as per the standard ASTM D 4935-99, where the pre-wetted fabric having an area of 100 cm$^2$ was allowed to dry in a controlled environment (60% RH, 23° C.) and weight loss was observed with time. First, fabric dry weight ($W_f$) was recorded after drying to a constant weight. Then the fabric was wetted with distilled water until the fabric wet weight was equal to 30% of the dry weight ($W_0$). The loss of weight ($W_i$) due to drying was continuously measured. The remained water ratio (RWR) was calculated according to the equation below.

$$RWR(\%) = \frac{w_i - w_f}{w_0 - w_f} \times 100$$

A spreading test was carried out to evaluate water spreading performance of modified fabrics with slightly modified version of AATCC 79:2000 (the AATCC standard test method for Absorbency of Bleached Textiles). Fabric samples having dimensions of 10 cm×10 cm were placed on a Teflon lined stage horizontally and a water droplet having a volume of 0.2 mL was dripped on to the fabric. Images were captured at 5$^{th}$, 10$^{th}$, 20$^{th}$, 30$^{th}$, 60$^{th}$ and 90$^{th}$ second and the diffusion area was calculated. The experiment was repeated three times and an average area was obtained.

Directional moisture transport properties of the fabrics were evaluated using a wet isolation ability test. A drop of distilled water having a volume of 0.2 mL was placed on top of a glass plate. Standardized fabric specimens were placed on the drop of water inner side down and kept for 1 minute. The wetted fabric piece was put on top of a dry piece of filter paper (Initial weight recorded $W_o$) in such a way that inner side touches the filter paper. Then a dead weight having 0.5 g/cm$^2$ was placed above the combined setup and kept for 30 seconds. Instantly weight of the filter paper ($W_a$) was recorded. The experiment was repeated three times for accuracy and repeatability. From the data obtained Moisture Picking Ratio was calculated.

$$MPR(\%) = \frac{(w_a - w_0)}{0.2} \times 100\%$$

Results and Discussion

1) SEM Observations

Figure 7:
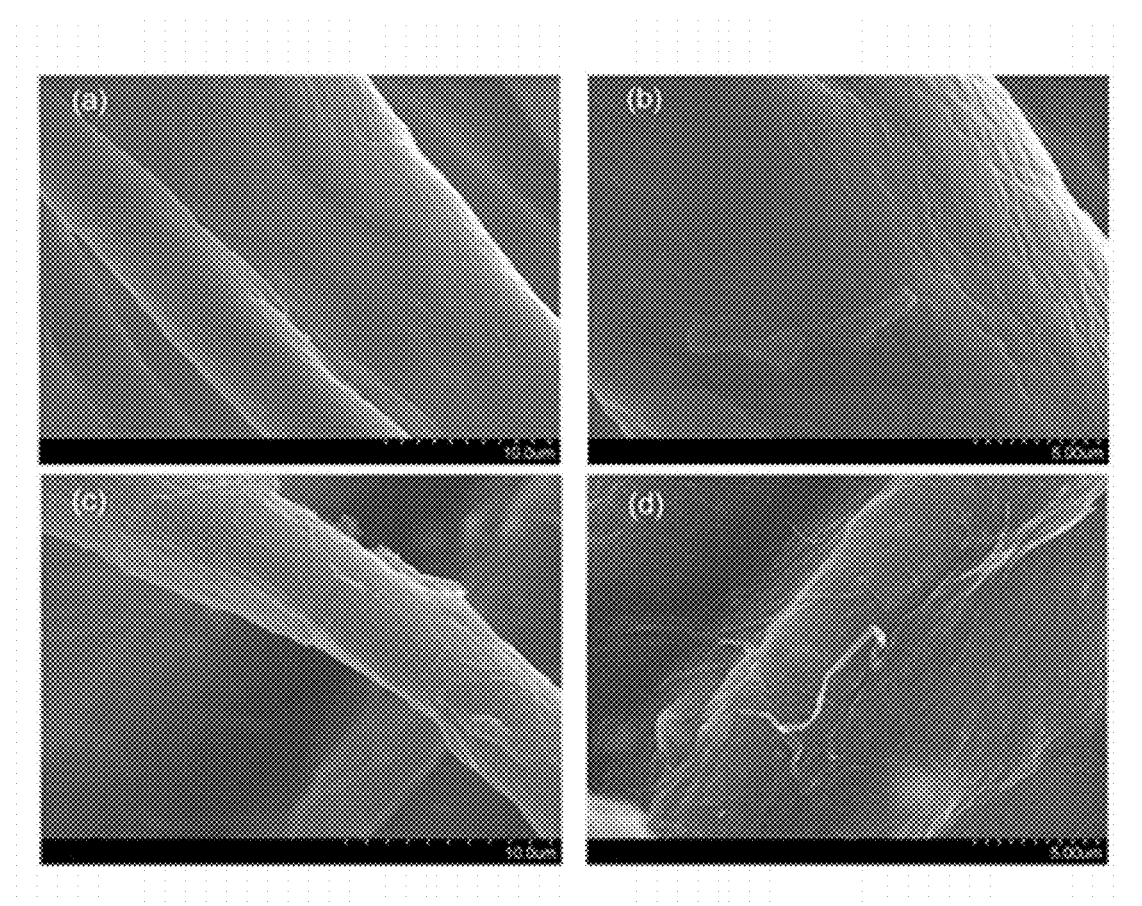
FIG. 7a is a surface morphology of untreated cotton fiber.
FIG. 7b is a surface morphology of an untreated cotton fiber surface.
FIG. 7c is a surface morphology of nanofiber grafted cotton fiber according to an example embodiment of the present invention.
FIG. 7d is a surface morphology of nanofiber grafted cotton fiber surface according to an example embodiment of the present invention.

Successful deposition of CNF layer on the cotton fiber surface was proven by using SEM imaging. FIG. 7 shows SEM images of untreated cotton fiber surface and cotton fiber treated with 0.5 g/l solution of CNF. SEM images of untreated cotton taken at two magnifications are given in FIG. 7a and FIG. 7b. The twisted and wrinkled structure of cotton fiber with the characteristic concave groove spiraling around the fiber with an angle to the axis of the fiber can be identified from these images. The surface of the untreated cotton fiber is comparatively smooth with many ridges situated parallel to each other.

Figure 8:
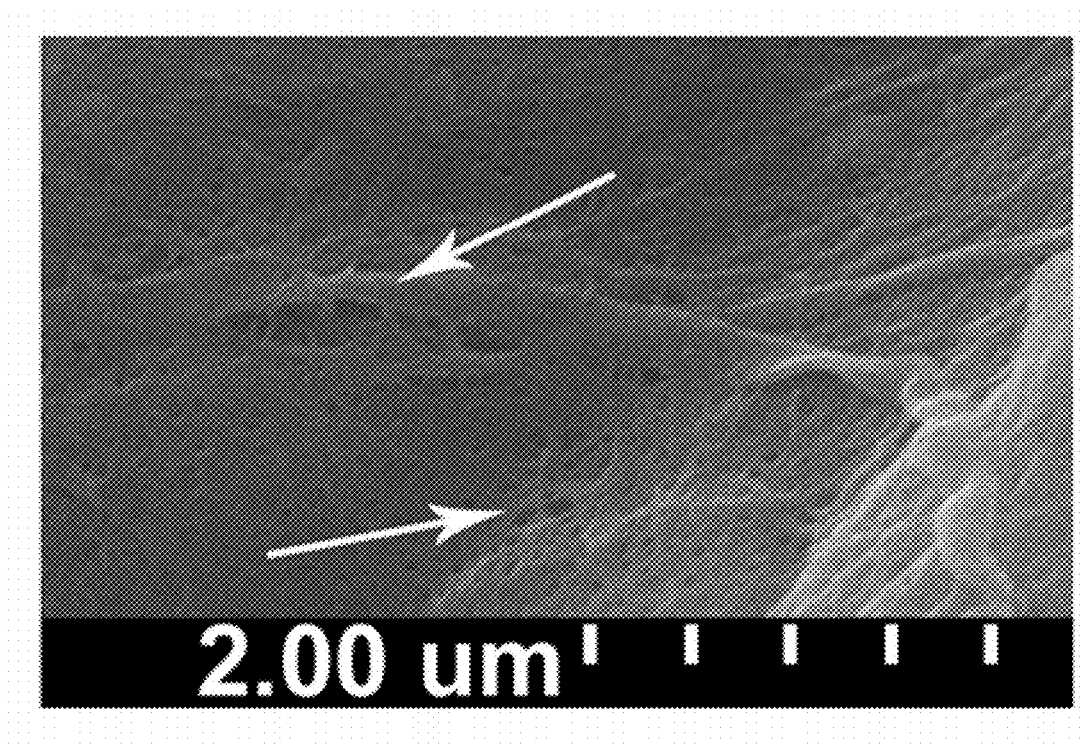
FIG. 8 is a nanofiber layer formed on top of the cotton fiber after the grafting process according to an example embodiment of the present invention.

On the other hand, a remarkable difference can be observed with the fabrics treated with the CNF dispersion. FIG. 7c shows a single fiber of CNF treated fabric, where continuous coating on the surface of the fiber is clearly visible. Parallel ridges on the surface of the untreated cotton fiber are not visible any more in the treated cotton fabrics. Instead they are covered with randomly oriented ridges indicating a development of a secondary structure on the fiber surface. By analyzing the thickness of the coating where the splitting has taken place, it was possible to evaluate the coating thickness to be somewhere between 50 to 150 nm. FIG. 7d shows a magnified image of the fiber surface. By analyzing these images, it was possible to conclude that the observed coating is a construction of many smaller fibers which are typically smaller than 100 nm. Most importantly, the coating is continuous and made of a randomly oriented mesh like formation as expected. Close investigation of coating surface reveals that it is not compactly filled. FIG. 8 shows indication of such porous coating development on the fiber surface. Porous structures having diameters in the range of 80 to 200 nm are clearly visible (as indicated by the arrows). Because the CNF are randomly oriented, it is reasonable to expect that they form a porous mesh coating. Development of porous coating offers an additional advantage since they can retain more moisture than a non-porous coating.

2) AFM Surface Roughness Characterization

Although SEM can be used successfully to characterize CNF coating development and distribution, AFM data can be used to further complement the information obtained. It is a very well adopted technique especially in surface topology imaging and for surface roughness calculations. FIG. 9 shows AFM topology images of unmodified cotton fiber surface and fiber modified with CNF. As shown in FIG. 9a for the case of raw fiber, fibrils are visible which are parallel to each other and spiraling around the fiber in an angle to fiber axis. In FIG. 9b, which shows the surface of a cotton fiber of modified CNF, a randomly oriented small fiber network can be seen. Individual fiber width is in the range of 40 nm-150 nm. TABLE 2 lists the roughness values of the untreated cotton fiber and one modified with CNF. Table data suggest that the surface roughness has increased significantly with the CNF modification. These data further show that a CNF layer has successfully been developed on the surface of the cotton.

3) Vertical Wicking Test

A fabric's ability to transport moisture away from its source is a very important property in terms of moisture management. Moisture transport can happen through three fundamental processes; diffusion, sorption/desorption and convection. Wicking is the spontaneous flow of moisture through the porous material such as fabric mainly driven by capillary forces. It is a form of diffusion process that is responsible for moisture transport in fabrics. FIG. 10 presents the wicking height taken at different times for untreated fabric and for fabrics modified with different methods. The curve for wicking height has a characteristic shape. It starts with a steeper slope due to quick moisture wicking and then slowly flattens with time, indicating gradual moisture propagation through the fabric. These two characteristic slope shapes are explained as a result of existence of both macro and micro channels in the fabric structure. Knitting yarn is composed of fibers that are almost parallel to each other. Small spaces between the fibers produce micro channels for water to pass through. In the same way macro channels exist in the fabric between two yarns. Even though the absorbent fibrous systems such as cotton fabrics have complex pore structures, they are usually treated as simple capillary flow modal systems to explain the wicking behavior. Capillary wicking rise (L) can be denoted by the following equation.

$$\frac{dL}{dt} = \left(\frac{r_c^2}{8\eta}\right)\left(\frac{\Delta p}{L} - \rho_l g\right)$$

Where $r_c$ is the capillary radius, $\eta$ is the fluid viscosity, L is the wetted length, $\rho_l$ is the density of liquid and g is the gravitational acceleration. The term $\Delta p$ represents the pressure difference due to capillary effect which is given by the following equation.

$$\Delta p = \frac{2\gamma \cos\theta}{r_c}$$

In the equation above, $\gamma$ is the surface tension of the fluid and $\theta$ is the contact angle of solid-fluid interface.

Considering all other fluid and environmental parameters to be constant, capillary radius and contact angle can be identified as variable parameters. Contact angle is a surface property which mainly depends on the chemical nature and roughness of the surface. Capillary radius however, depends more on fabric properties such as thickness, fiber radius, and number of fibers in the yarn.

However, capillary flow does not sustain indefinitely since, at some point gravitational pull will reach the weight of the column of the liquid with the capillary rise, so that the net force is zero and the capillary rise stops. Equilibrium capillary height ($L_{eg}$) is expressed in the equation below.

$$L_{eq} = \frac{\Delta p}{\rho_l g}$$

By integrating equation 1, instantaneous liquid height L is obtained through the equation below.

$$\ln\left(1 - \frac{L}{L_{eq}}\right) - \frac{L}{L_{eq}} = B_1 t$$

In the equation above, $B_1$ is the constant equal to $r_c^2 \rho_1 g/8\eta L_{eq}$. By observing the equation we can see that the capillary rise approaches equilibrium value asymptotically which closely represents the shape of the data obtained during the wicking experiment. At small values of t, where L remains small compared to $L_{eq}$, the above equation can be expressed with following approximation, which donates the famous Washburn equation (shown below).

$$L = \sqrt{\frac{r_c \gamma \cos\theta}{2\eta}} \, t^{1/2} = k_0 t^{1/2}$$

However, this model relies on assumptions, most importantly it assumes that the capilary height does not change with time (ie: $r_c$ is not a function of t). For water absorbant materials like cotton, water affects the capillary dimensions. Therefore, an appropriate correction must be made to the above equation. Two correction options follow: first is the instantanious effect on capillary dimensions by water; second is the slow effect of water on capillary dimension. It can be proven that if the influence is instantanious, the general Washburn equation does not change, except that the capilary radius ($r_c$) term is replaced with effective capillary radius ($r_e$). But if the effect is slow, water continuously diffuses into the fibers and eventually makes the effective capillary radius a function of time. This generally happens if the fabric structure is composed of a highly swellable type of fiber.

Under such conditions, the Washburn equation doesn't hold true yet it follows a relationship that can be detonated as $L=kt^m$. One can mathematically test this by plotting the log L verses log T and assess linearity of the graph. To test which category a fabrics falls into, one can express the Washburn equation as $L=kt^m$ and then y obtaining the log L verses log T plot, we can easily determine which case our fabrics fall into.

FIG. 11 shows the log L verses log T plot for the wicking test data for unmodified fabrics and modified fabrics. It can be clearly seen that data for cotton fabrics and cotton fabric modified with MCAA follows a line indicating a small but immediate water diffusion into the fibers. Fabrics modified with CNF clearly deviate from this line following a straight line suggesting highly absorbent layer of CNF slowly diffusing in more water, thus causing the capillary radius to change with time. This test clearly shows that the layer of CNF affects the wicking properties of the fabric.

For the fabrics tested, the highest initial rate of wicking was observed for fabrics modified with MCAA. This is likely due to increased amount of carboxylic acid groups on the surface of the fiber. These groups make strong bonds with water, effectively making the surface more hydrophilic as compared with cotton, further reducing the contact angle. Since fluid has a smaller contact angle than a fiber surface, it is subjected to strong capillary forces, thus increasing the wicking rate. On the other hand, cotton fabrics treated with CNF show the lowest wicking rate. This is due to excessive swelling of the CNF during the capillary rise, thus compromising the wicking rate. Normal cotton and MCAA modified cotton fabrics treated with CNF shows similar performance in terms of their wicking rates. We can expect that, though CNF tends to inhibit the initial wicking rate, a compromise has been met in fabrics treated using MCAA, due to higher hydrophilicity.

4) Spreading Test

The water spreading ability of fabrics is a very important property in moisture management since it determines how rapidly a fabric can adjust the water concentration gradient. Due to low water spreading behavior, a fabric can feel damp and become uncomfortable to wear. Due to a high localized concentration of water, the humidity level at microclimate between the skin and the fabric can increase as a response to the higher localized water concentration. It can also significantly affect the drying rate, thermal conductivity, and moisture vapor transmission rate of the fabric.

When a droplet of water is placed on top of a fabric it will be subjected to spreading due to capillary forces, provided that the contact angle is less than 90°. Contact angle plays an important role here since it determines the surface hydrophilicity. The spreading area mainly depends on surface contact angle, permeability of the fabric, thickness of the fabric and liquid properties such as surface tension, viscosity, and droplet volume.

A comparison of water spreading area with time for different treatment systems is presented in FIG. 12. Highest spreading was obtained for fabrics treated with MCAA. MCAA treatment will produce more hydrophilic groups on the surface of cotton fabrics, thus increasing the fabric's spreading ability. Fabric treatment with CNF also increases the spreading of water. A nanofiber layer on top of the fiber surface can produce an increased number of capillaries for the water to spread across the fabric. Fabrics modified with MCAA and treated with CNF show an increased spreading ability compared with untreated fabrics grafted with CNF. This can again be described as due to increased hydrophilicity of the fabric after MCAA treatment.

5) Wet Isolation Ability Test

The most important property of a moisture management textile is its ability to wick the moisture out from the inner surface to outer surface. Fabrics that lack this property will retain more moisture next to the skin, causing a clammy sensation. Excessive body sweat is produced during extensive physical activity. If a fabric lacks directional moisture transfer properties, sweat can accumulate on the inner surface of the fabric and the fabric can cling on to the wearer's skin.

Wicking the moisture to the outside surface of the fabric also increases the fabric's drying rate, since moisture accumulated on the outer surface of the fabric can readily undergo convective drying. Directional movement of moisture through the fabric can be enhanced by modifying the fiber surface properties to increase rapid wicking and providing a more absorbent layer on the outer surface of the fabric. This is achieved by modifying fiber surface with MCAA to improve its wicking ability, as we have shown herein with the wicking test, and providing a more absorbent outside layer using CNF on the outer surface of the fabric.

The wet isolation ability test quantifies the available moisture that can be picked up from the inner surface of the fabric after it has been wetted and allowed sufficient time to transfer the liquid from the inner surface to the outer surface. The weight of moisture available for pickup from the inner surface compared with the initial weight of the water applied to wet the fabric was calculated as MPR (%). If the MPR % is higher for a fabric, that indicates fabric has a lower directional transport property since a smaller amount of water was transferred across the fabric.

Figure 13:
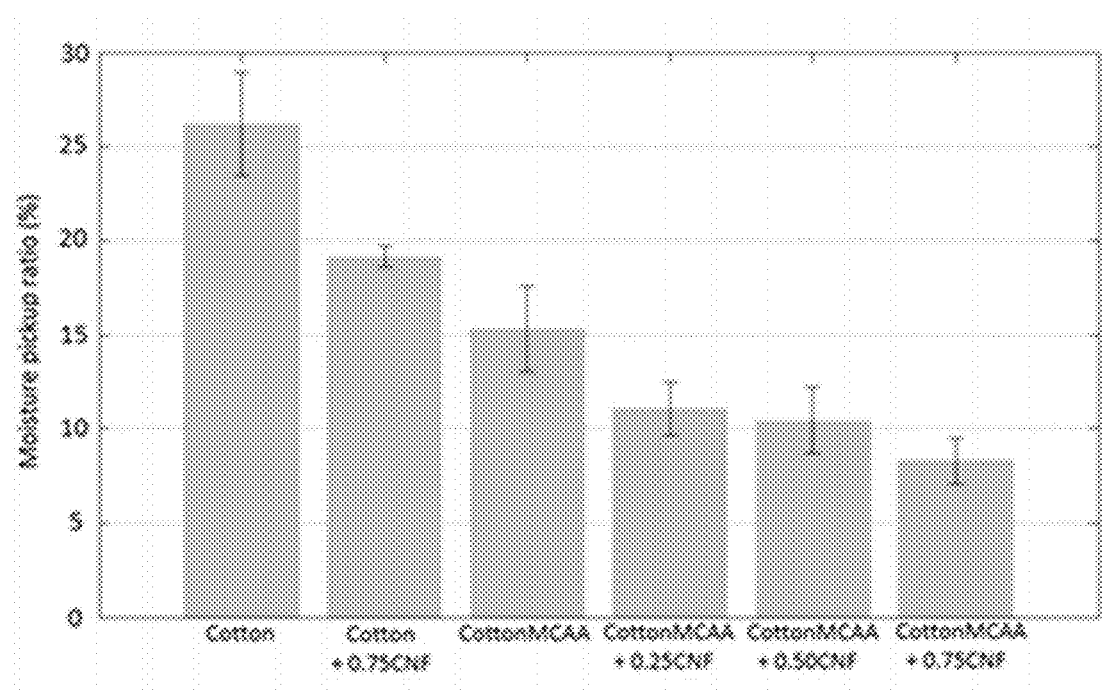
FIG. 13 is a moisture pick ratio for different fabric systems according to example embodiments of the present invention.

Calculated MPR (%) for different systems is given in FIG. 13. Lowest MPR (%) was seen in the fabric that is modified with MCAA and treated with 0.75 g/l dispersion of CNF. This system can transfer more than 98% of the water in to the fabric structure once wetted. This indicates the successful directional transport properties of the fabric treated using the method described in the paper. The directional transport property increases with the CNF concentration in the treatment dispersion. Cotton has the lowest directional transport properties, having the capability only to transport 75% of the water through the fabric after wetting. Fabric modified with MCAA also shows improved directional moisture transport properties than cotton, having the ability to transfer 85% of the water through the fabric structure. This can be attributed to its improved wicking and spreading capabilities. Untreated cotton fabric grafted with CNF also shows higher performance than normal cotton. Though wicking power is comparatively lower, having a more absorbent layer on the outer surface can encourage directional moisture transport, which may be the reason for this observation.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A moisture management garment, a cross-section of said garment comprising:
    (a) a inner layer comprising hydrophobic titanium dioxide nanoparticles;
    (b) a middle layer comprising carboymethylated hydrophilic fibers abutting said first layer, wherein the hydrophilicity of said middle layer decreases across said middle layer in the direction of said first layer; and
    (c) an outer layer comprising hydrophilic chitin or chitosan nanofibers, abutting said middle layer on the side of said middle layer opposite said first layer, said outer layer being more hydrophilic than said first layer;
    wherein the decrease in hydrophilicity of said middle layer in the direction of said first layer is caused by a gradient in the concentration of a chemical agent across said middle layer.

2. The moisture management garment of claim 1 wherein the garment is a shirt.

3. The moisture management garment of claim 1 wherein the garment is a skirt.

4. The moisture management garment of claim 1 wherein the garment is a dress.

5. The moisture management garment of claim 1 wherein the garment is shorts.

6. The moisture management garment of claim 1 wherein the garment is pants.

7. The moisture management garment of claim 1 wherein the garment is underwear.

8. The moisture management garment of claim 1 wherein the garment is a wristband.

9. The moisture management garment of claim 1 wherein the garment is a headband.

10. The moisture management garment of claim 1 wherein the garment is a sock.

11. The moisture management garment of claim 1 wherein the garment is footwear liner.

* * * * *